(12) United States Patent
Boyd et al.

(10) Patent No.: US 7,965,288 B2
(45) Date of Patent: Jun. 21, 2011

(54) METHOD AND SYSTEM FOR DEFINING AND CONTROLLING ALGORITHMIC ELEMENTS IN A GRAPHICS DISPLAY SYSTEM

(75) Inventors: Charles N. Boyd, Woodinville, WA (US); Michael A. Toelle, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 12/604,102

(22) Filed: Oct. 22, 2009

(65) Prior Publication Data

US 2010/0039430 A1    Feb. 18, 2010

Related U.S. Application Data

(63) Continuation of application No. 10/971,484, filed on Oct. 22, 2004, now Pat. No. 7,800,607, which is a continuation of application No. 09/796,577, filed on Mar. 1, 2001, now Pat. No. 7,159,041.

(60) Provisional application No. 60/187,535, filed on Mar. 7, 2000.

(51) Int. Cl.
*G06F 17/00* (2006.01)

(52) U.S. Cl. .................................. 345/418; 345/419

(58) Field of Classification Search .................. 345/418, 345/419, 581, 619
See application file for complete search history.

(56) References Cited

U.S. PATENT DOCUMENTS

| | | | |
|---|---|---|---|
| 4,805,098 A | 2/1989 | Mills, Jr. et al. | |
| 4,953,073 A | 8/1990 | Moussouris et al. | |
| 4,959,779 A | 9/1990 | Weber et al. | |
| 5,027,270 A | 6/1991 | Riordan et al. | |
| 5,122,783 A * | 6/1992 | Bassetti, Jr. | 345/88 |
| 5,269,021 A | 12/1993 | Denio et al. | |
| 5,388,841 A * | 2/1995 | San et al. | 463/44 |
| 5,394,524 A | 2/1995 | DiNicola et al. | |
| 5,398,328 A | 3/1995 | Weber et al. | |
| 5,590,294 A | 12/1996 | Mirapuri et al. | |
| 5,594,854 A * | 1/1997 | Baldwin et al. | 345/441 |
| 5,650,941 A * | 7/1997 | Coelho et al. | 345/619 |
| 5,671,401 A * | 9/1997 | Harrell | 345/505 |

(Continued)

OTHER PUBLICATIONS

Olano et al., A Programmable Pipeline for Graphics Hardware, PHD Dissertation, Deperatment of Computer Science, University of North Carolina at Chapel Hill, 1998, 1-168.*

(Continued)

*Primary Examiner* — Xiao M Wu
*Assistant Examiner* — Charles Tseng
(74) *Attorney, Agent, or Firm* — Woodcock Washburn LLP

(57) ABSTRACT

An API is provided that enables programmability of a 3D chip, wherein programming or algorithmic elements written by the developer can be downloaded to the chip, thereby programming the chip to perform those algorithms. A developer writes a routine that is downloadable to a 3D graphics chip. There are also a set of algorithmic elements that are provided in connection with the API that have already been programmed for the developer, that are downloadable to the programmable chip for improved performance. Thus, a developer may download preexisting API objects to a 3D graphics chip. A developer adheres to a specific format for packing up an algorithmic element, or set of instructions, for implementation by a 3D graphics chip. The developer packs the instruction set into an array of numbers, by referring to a list of 'tokens' understood by the 3D graphics chip. This array of numbers in turn is mapped correctly to the 3D graphics chip for implementation of the algorithmic element by the 3D graphics chip.

38 Claims, 14 Drawing Sheets

U.S. PATENT DOCUMENTS

| | | | |
|---|---|---|---|
| 5,673,377 A | 9/1997 | Berkaloff | |
| 5,721,928 A | 2/1998 | Umehara et al. | |
| 5,764,963 A * | 6/1998 | Ware et al. | 345/563 |
| 5,793,374 A * | 8/1998 | Guenter et al. | 345/426 |
| 5,793,386 A * | 8/1998 | Larson et al. | 345/553 |
| 5,798,762 A * | 8/1998 | Sfarti et al. | 345/420 |
| 5,801,717 A * | 9/1998 | Engstrom et al. | 345/539 |
| 5,812,136 A * | 9/1998 | Keondjian | 345/419 |
| 5,815,703 A * | 9/1998 | Copeland et al. | 1/1 |
| 5,822,570 A * | 10/1998 | Lacey | 703/26 |
| 5,844,569 A * | 12/1998 | Eisler et al. | 345/619 |
| 5,850,232 A * | 12/1998 | Engstrom et al. | 345/539 |
| 5,861,893 A | 1/1999 | Sturgess | |
| 5,864,703 A | 1/1999 | van Hook et al. | |
| 5,880,736 A | 3/1999 | Peercy et al. | |
| 5,887,172 A | 3/1999 | Vasudevan et al. | |
| 5,949,424 A | 9/1999 | Cabral et al. | |
| 5,964,843 A | 10/1999 | Eisler et al. | |
| 5,974,410 A * | 10/1999 | Copeland et al. | 1/1 |
| 6,008,816 A * | 12/1999 | Eisler et al. | 345/589 |
| 6,044,408 A | 3/2000 | Engstrom et al. | |
| 6,078,942 A | 6/2000 | Eisler et al. | |
| 6,198,488 B1 * | 3/2001 | Lindholm et al. | 345/426 |
| 6,208,361 B1 | 3/2001 | Gossett | |
| 6,213,652 B1 | 4/2001 | Suzuki et al. | |
| 6,215,495 B1 | 4/2001 | Grantham et al. | |
| 6,249,294 B1 | 6/2001 | Lefebvre et al. | |
| 6,252,600 B1 | 6/2001 | Kohli et al. | |
| 6,289,396 B1 | 9/2001 | Keller et al. | |
| 6,359,619 B1 * | 3/2002 | Waters et al. | 345/426 |
| 6,359,630 B1 | 3/2002 | Morse et al. | |
| 6,362,825 B1 * | 3/2002 | Johnson | 345/522 |
| 6,414,688 B1 | 7/2002 | Jeddeloh | |
| 6,452,595 B1 | 9/2002 | Montrym et al. | |
| 6,489,963 B2 | 12/2002 | Parikh et al. | |
| 6,496,183 B1 | 12/2002 | Bar-Nahum | |
| 6,515,671 B1 * | 2/2003 | Lindholm et al. | 345/506 |
| 6,525,725 B1 | 2/2003 | Deering | |
| 6,525,737 B1 * | 2/2003 | Duluk et al. | 345/506 |
| 6,559,842 B1 * | 5/2003 | Deering et al. | 345/420 |
| 6,578,197 B1 * | 6/2003 | Peercy et al. | 717/143 |
| 6,650,327 B1 * | 11/2003 | Airey et al. | 345/520 |
| 6,717,576 B1 * | 4/2004 | Duluk et al. | 345/419 |
| 6,765,571 B2 | 7/2004 | Sowizral et al. | |
| 6,819,325 B2 | 11/2004 | Boyd et al. | |
| 6,874,150 B2 | 3/2005 | Noyle | |
| 7,159,041 B2 | 1/2007 | Boyd et al. | |
| 7,761,884 B2 | 7/2010 | Noyle | |
| 7,782,316 B2 | 8/2010 | Boyd et al. | |
| 7,800,606 B2 | 9/2010 | Boyd et al. | |
| 7,800,607 B2 | 9/2010 | Boyd et al. | |
| 2004/0012597 A1 | 1/2004 | Zatz et al. | |
| 2004/0201590 A1 | 10/2004 | Wu et al. | |
| 2005/0027682 A1 | 2/2005 | Boyd et al. | |
| 2005/0052456 A1 | 3/2005 | Boyd et al. | |
| 2005/0086669 A1 | 4/2005 | Boyd et al. | |

OTHER PUBLICATIONS

Segal et al., The OpenGL Graphics System: A Specification (Version 1.2.1), Silicon Graphics, Apr. 1, 1999, 1-278.*
U.S. Appl. No. 09/796,577: Final Rejection, Jun. 23, 2005.
U.S. Appl. No. 09/796,577: Final Rejection, Mar. 27, 2006.
U.S. Appl. No. 09/796,577: Non-Final Rejection, Aug. 5, 2004.
U.S. Appl. No. 09/796,577: Non-Final Rejection, Dec. 23, 2005.
U.S. Appl. No. 09/796,577: Non-Final Rejection, Feb. 24, 2005.
U.S. Appl. No. 09/796,577: Notice of Allowance, Oct. 5, 2006.
U.S. Appl. No. 09/796,579: Final Rejection, Aug. 24, 2004.
U.S. Appl. No. 09/796,579: Non-Final Rejection, Feb. 11, 2004.
U.S. Appl. No. 09/796,579: Non-Final Rejection, Oct. 2, 2003.
U.S. Appl. No. 09/796,579: Notice of Allowance, Nov. 12, 2004.
U.S. Appl. No. 10/961,435: Non-Final Rejection, Dec. 31, 2008.
U.S. Appl. No. 10/961,435: Non-Final Rejection, Sep. 25, 2009.
U.S. Appl. No. 10/961,435: Notice of Allowance, Mar. 22, 2010.
Abrash, "Inside Xbox Graphics", Dr. Dobb's J., Aug. 1, 2000, 21-22, 24-26.
Antinori et al., "Experience with a 30 cm2 silicon pixel plane in CERN experiment WA97", Nuclear Instruments and Methods in Physics Research Section A, Accelerators, Spectrometers, Detectors and Associated Equipment, Jun. 1995, 360(1-2), 91-97.
Bachstein et al., "Single-Chip erledigt Multimedia", Elektronik, 1996, 17, 58-62.
Bajaj et al., "Making 3D Textures Practical", IEEE Proceedings of Seventh Pacific Conference on Computer Graphics and Applications, Oct. 5-7, 1999, 259-269.
Bakalash et al., "A Barrel Shift Microsystem for Parallel Processing", IEEE Proceedings of the 23rd Annual Workshop and Symposium in Micro 23 Microprogramming and Microarchitecture, Orlando Florida, Nov. 27-29, 1990, 223-229.
Bankston et al., "Pipeline Processing with Modula-2", J. Pascal, Ada, & Modula-2, (no month available) 1986, 5(5), 46-51.
Biernat et al., "Approximate Shadow Generation", IEEE Montech Conferences, Nov. 912, 1987, 97-101.
Brechbühler et al., "Parametrization of Closed Surfaces for 3-D Shape Description", Comp. Vision Image Understanding, Mar. 1995, 61(2), 154-170.
Chen, "Generalization Discrete Object Tracking Algorithms and Implementation", Proceedings of SPIE in Vision Geometry VI, Melter, R.A. et al. (eds.), Jul. 28-29, 1997, 3168, 184-195.
Chiarulli et al., "Draft: A Dynamically Reconfigurable Processor for Integer Arithmetic", IEEE Proceedings of 7th Symposium on Computer Arithmetic, University of Illinois, Hwang, K. (ed.), Jun. 4-6, 1985, 309-317.
Chin et al., "The OpenGL Graphics System Utility Library", Editor (version 1.3): Jon Leech, Silicon Graphics, Inc., Nov. 4, 1998, 1-42.
Conference Paper, "A Shading and Compositing Processor based on Crossbar Switches and SRAM Memory", (no month available) 1999, 4 pages.
Corrie et al., "Data Shaders", Proceedings of Visualization '93, San Jose, CA, Oct. 25-29, 1993, 275-282.
Cox et al., "Multi-Level Texture Caching for 3D Graphics Hardware", IEEE of Proceedings of The 25th Annual International Symposium on Computer Architecture, Barcelona, Spain, Jun. 27-Jul. 1, 1998, 86-97.
Dietz et al., "Simple Networks for Pixel Plane Median Filtering", IEEE Transactions on Circuits and Systems-II, Analog and Digital Signal Processing, Dec. 1993, 40(12), 799-801.
Glazzard et al., "Implementing a Shading Language", Computer Graphics 90, London, UK, Nov. 6-8, 1990, 111-121.
Gomes et al., "Graphical Objects", The Visual Computer, (no month available) 1996, 12, 269-282.
Gordon et al., "Window Management, Graphics, and Operating Systems, Operating Systems Review", Jul. 1987, 21(3), 5-8.
Goris et al., "A Configurable Pixel Cache for Fast Image Generation", IEEE Computer Graphics and Applications, Mar. 1987, 24-32.
Grimes et al., "A New Processor with 3-D Graphics Capabilities", Proceedings of 10th Annual Conference and Exposition Dedicated to Computer Graphics NCGA '89 Conference, Philadelphia, Pennsylvania, Apr. 17-20, 1989, 1, 275-284.
Grimes et al., "The Intel i860 64-Bit Processor: A General-Purpose CPU with 3D Graphics Capabilities", IEEE Computer Graphics and Applications, Jul. 1989, 85-94.
Haig, "How to program in machine language", Electronics, Aug. 1982, 94-96, 98, 100-103.
Hanrahan et al., "A Language for Shading and Lighting Calculations", Computer Graphics, (no month available) 1990, 24(4), 289-298.
Harrison et al., "The Role of Microcomputers in Interactive Graphical Planning", Proc. Of Engin. Software for Microcomputers, Apr. 1984, 631-641.
Ho et al., "Efficient Point-Based Rendering Techniques for Haptic Display of Virtual Objects", Presence, Oct. 1999, 8(5), 477-491.
Hoffman et al., "Automatic Surface Generation in Computer Aided Design", supported by the National Science Foundation, Department of Computer Science, Cornell University, Ithaca, New York, Jan. 1985, 1-22.
Hummel, "Render Benders: 26 Graphics Cards for Fast 3-D", Byte, Mar. 1998, 112-119.

James, "3-D graphics to become accessible to all", Scientific Computing World, Feb. 1997, 41 and 43.

Johnson, "Direct3D Revealed: Microsoft's 3-D API provides device-independent access to acceleration hardware. Here's how it works", Core Technologies, http:—byte.com-art-9612-sec5-art4.htm, accessed Dec. 1996.

Jones et al., "High-Performance Graphics Via Silicon Compilation", VLSI Systems Design, Mar. 1987, 32, 33, 36 and 38.

Kaya, "New Trends in Graphic Display System Architecture", Proceedings of Computer Graphics in Frontiers in Computer Graphics, Tokyo'84, Kunii, T.L. (ed.), (no month available) 1985, 310-320.

Kumar et al., "Efficient rendering of trimmed NURBS surfaces", Computer-Aided Disign, Jul. 1995, 27(7), 509-521.

Labsik et al., "Progressive transmission of subdivision surfaces", Computational Geometry, (no month available) 2000, 15, 25-39.

Lachaud et al., "Continuous Analogs of Digital Boundaries: A Topological Approach to Iso-Surfaces", Graphical Models, (no month available) 2000, 62, 129-164.

Lapidous et al., "Optimal Depth Buffer for Low-Cost Graphics Hardware", Trident Microsystems, Inc., (no month available) 1999, 67-73.

Lastra et al., "Real-Time Programmable Shading", Proceedings of 1995 Symposium on Interative 3D Graphics, Monterey, California, Apr. 9-12, 1995, 59-66.

Lee et al., "SPARP: a single pass antialiased rasterization processor", Comput. & Graphics, (no month available) 2000, 24, 233-243.

Leech, "OpenGL Extensions and Restrictions for PixelFlow", The University of North Caroline at Chapel Hill, (no month available) 1995, 1-39.

Lichten, "A Solution to Surface Connectivity Problems in Computer-Aided Design", Computer Graphics, Mar. 1981, 14(4), 168-199.

Mabin et al., "A Parallel Algorithm to Reconstruct Bounding Surfaces in 3D Images", J. Supercomputing, (no month available) 1998, 12, 137-155.

McManus et al., "Optimal Static 2-Dimensional Screen Subdivision for Parallel Rasterization Architectures", Comput. & Graphics, (no month available) 1997, 21(2), 159-169.

Meyers et al., "Surfaces from Contours", ACM Transactions on Graphics, Jul. 1992, 11(3), 228-258.

Micikevicius et al., "Teaching a Computer Graphics Class Using DirectX", Proceedings of the Ninth Annual CCSC South Central Conference, J. Comput. in Small Colleges, (Jackson, Mississippi, Apr. 17-18), Meinke, J.G. (ed.), Mar. 1998, 13(4), 61-66.

Molnar et al., "PixelFlow: High-Speed Rendering Using Image Composition", Computer Graphics, (no month available) 1996, 26(2), 231-240.

Molnar et al., "PixelFlow: The Continuing Saga", 1995 Parallel Rendering Symposium, Atlanta, GA, Oct. 30-31, 1995, p. 79.

Molnar, S., "The PixelFlow Texture and Image Subsystem", Computers & Graphics, 1996, 20(4), 491-502.

Nishimura et al., "A Multicomputer System Links: Its Architecture and Graphics Applications", International Conference on Industrial Electronics, Control and Instrumentation, IECON '84, Tokyo, Japan, Oct. 22-26, 1984, 1, 270-274.

NVIDIA Corporation, "System Platform Porcessor (SPP) / Integrated Graphics Processor (IGP): Redefining System and Graphics Performance", nForce SPP/IGP Product Overview, Jan. 2002, 1, 2 pages.

NVIDIA Corporation, "Technical Brief: NVIDIA nfiniteFX II Engine From Research to Real Time", Jan. 16, 2002, 7 pages.

NVIDIA Corporation, "Technical Brief: NVIDIA nForce Platform Processing Architecture", 2001, 1-9.

Ohbuchi et al., "Embedding Data in 3D Models", in Interactive Distributed Multimedia Systems and Telecommunication Services, 4th International Workshop, IDMS'97, Darmstadt, Germany, Sep. 10-12, 1997, 1-10.

Ohhashi et al., "A 32b 3-D Graphic Processor Chip with 10M Pixels/s Gouraud Shading", 1988 IEEE International Solid-State Circuits Conference Digest of Technical Papers, Feb. 1988, 168-169 and 352.

Olano et al., "A Shading Language on Graphics Hardware: The PixelFlow Shading System", Proceedings of SIGGRAPH 98, Orlando, Florida, Jul. 19-24, 1998, 1-10.

Olano et al., "Procedural Primitives in a High Performance, Hardware Accelerated, Z-Buffer Renderer", UNC Computer Science Technical Report 97-040, Department of Computer Science, University of North Carolina, Chapel Hill, North Carolina, (no month available) 1997, 1-10.

Olano, "A Programmable Pipeline for Graphics Hardware", PhD Dissertation, Department of Computer Science, University of North Carolina at Chapel Hill, (no month available) 1998, 1-168.

Pountain, "PixelFlow—Scalable Image Processing—It Divides and Conquers Rendering by Drawing the Objects First, Then Combining Them", Byte, (no month available) 1995, 20(11), p. 6.

Proudfoot et al., "A Real-Time Procedural Shading System for Programmable Graphics Hardware", Computer Graphics Proceedings, SIGGRAPH, (no month available) 2001, 159-170.

Rowlan et al., "A distributed, parallel, interactive vol. rendering package", IEEE Proceedings of Visualization'94, Washington, D.C., Oct. 17-21, 1994, 21-30.

Schneider et al., "An adaptive framework for 3D graphics over networks", Comput. & Graphics, (no month available) 1999, 23, 867-874.

Schneider et al., "M-Buffer: A Flexible MISD Architecture for Advanced Graphics", Comput. & Graphics, (no month available) 1995, 19(2), 239-246.

Senthinathan et al., "A 650-MHz, IA-32 Microprocessor with Enhanced Data Streaming for Graphics and Video", IEEE J. Solid-State Circuits, Nov. 1999, 34(11), 1454-1465.

Shinya, "Improvements on the Pixel-tracing Filter: Reflection/Refraction, Shadows, and Jittering", Proceedings: Graphics Interface'95, May 7-19, 1995, 92-102.

Shirali et al., "A Parallel Architecture Graphics Processor", IEEE Southeastcon Conference Proceedings, Knoxville, Tennessee, Apr. 11-13, 1998, 108-111.

Slusallek, et al., "Implementing RenderMan-Practice, Problems and Enhancements", Eurographics '94, 1994, (no month available) 13(3), 443-454.

Smith et al., "A Circuit-Switched Shared-Memory Multiprocessor", International J. Mini Microcomputer, (no month available) 1995, 17(3), 108-118.

Sussman et al., "Graphics Memory Architectures", Wescon/86 Conference Record, (no month available) 1986, 1-6.

Swanson et al., "A Fast Shaded-Polygon Rendered", Computer Graphics, Aug. 1986, 20(4), 95-101.

Teonnies et al., "Volume rendering for interactive 3-d segmentation", Proceeding of SPIE in Image Display, Newport Beach, California, Feb. 23-25, 1997, 3031, 602-609.

Thompson, "An inside look at the most popular 3-D environments: OpenGL, QuickDraw 3D, and Direct3D", http:—byte.com-art-9606-sec11-art4.htm, Must-See 3-D Engines, accessed Jun. 1996, p. 7.

Thompson, "Direct3D's Engine", Must-See 3-D Engines, http:—byte.com-art-9606-sec11-art7.htm, accessed Jun. 1996, p. 1.

Thompson, "Open GL's Command Structure", http:—byte.com-art-9606-sec11-art5.htm, Must-See 3-D Engines, accessed Jun. 1996, p. 1.

Thompson, "QuickDraw 3D=s Command Structure", Must-See 3-D Engines, http:—byte.com-art-9606-sec11-art6.htm, accessed Jun. 1996, p. 1.

Thompson, "Three Ways to Tackle Multithreading", Must-See 3-D Engines, http:—byte.com-art-9606-secll-art8.htm, accessed Jun. 1996, p. 1.

Wilson et al., "Designing a Graphics Application Interface", Proceedings Graphics Interface'85, Montreal, Quebec, May 27-31, 1985, 373-380.

Yoshida et al., "Trend of the computer graphics hardware", Information Processing Soc. of Japan, Oct. 1988, 29(10), 1109-1115.

Zheng et al., "Three-dimensional unstructured mesh generation: Part 2. Surface meshes", Comput. Methods Appl. Mech. Engrg., (no month available) 1996, 134, 269-284.

* cited by examiner

FIG. 4A
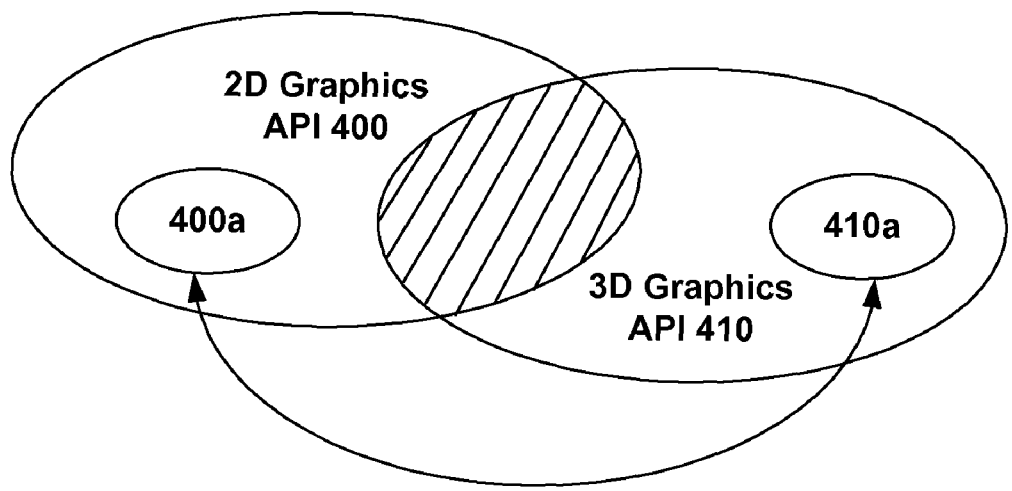
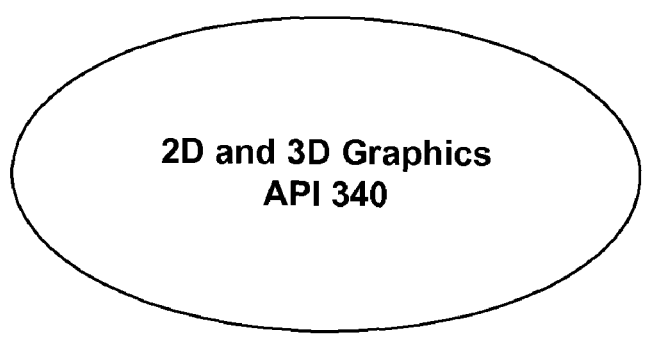

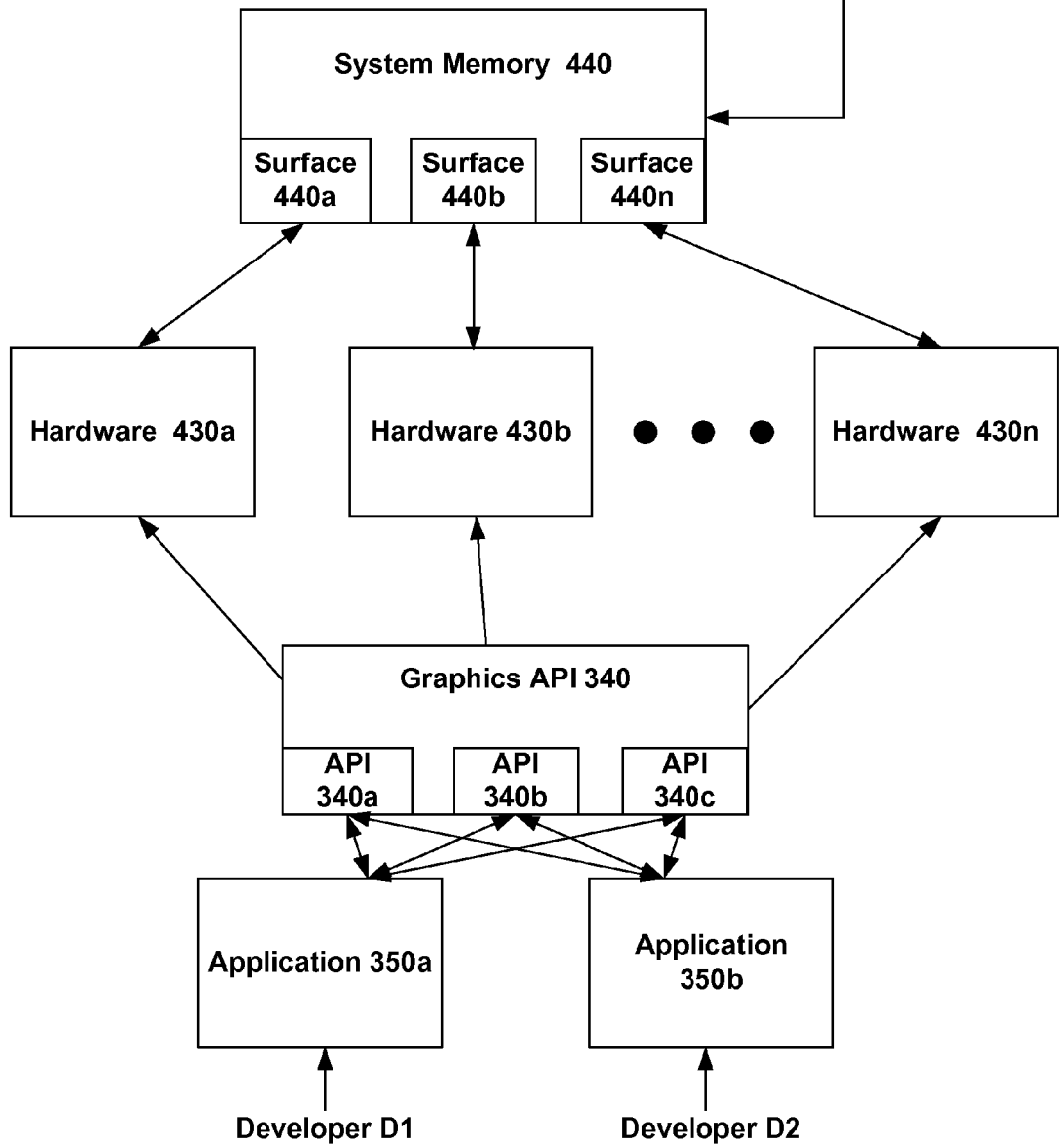

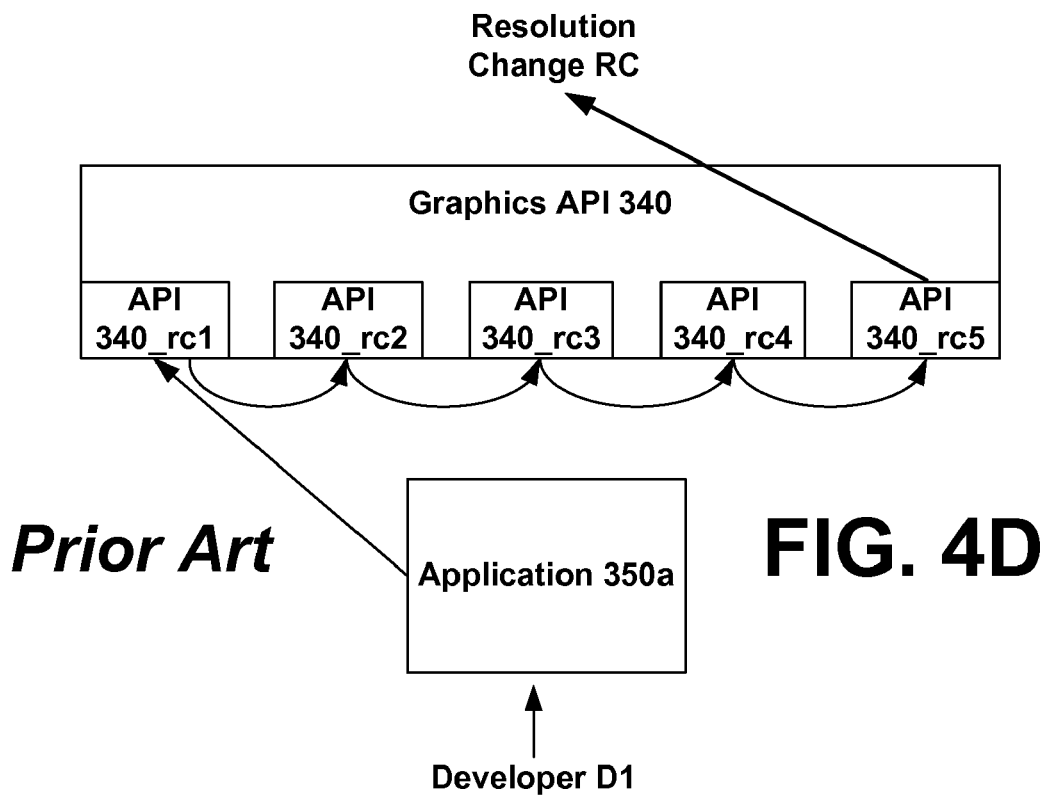
FIG. 4D *Prior Art*
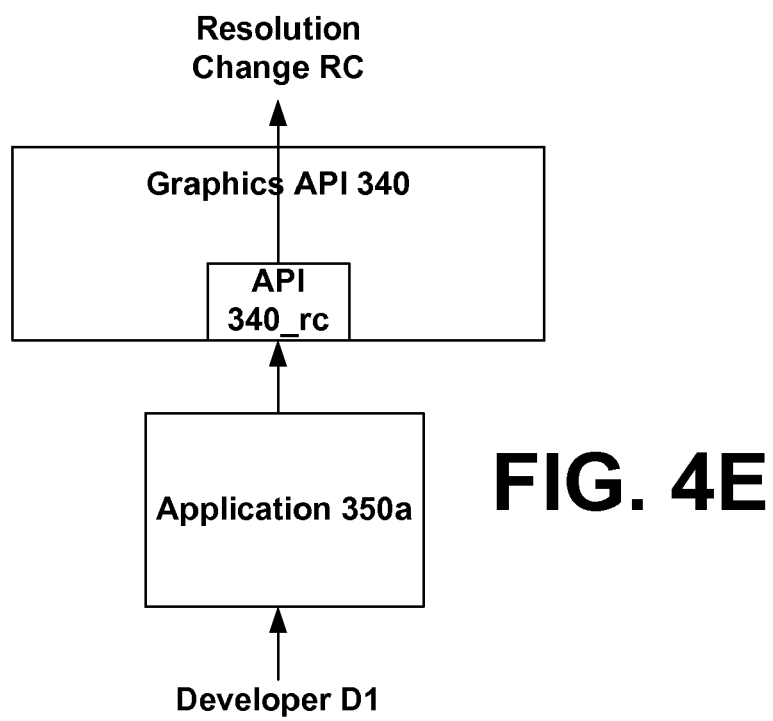
FIG. 4E

METHOD AND SYSTEM FOR DEFINING AND CONTROLLING ALGORITHMIC ELEMENTS IN A GRAPHICS DISPLAY SYSTEM

CROSS REFERENCE OF RELATED APPLICATIONS

This application is a continuation of U.S. patent application Ser. No. 10/971,484, filed Oct. 22, 2004, which is, in turn, a continuation of U.S. patent application Ser. No. 09/796,577, filed Mar. 1, 2001, which claims the benefit of U.S. Provisional Application Ser. No. 60/187,535, which was filed on Mar. 7, 2000, now U.S. Pat. No. 7,159,041, herein incorporated by reference.

FIELD OF THE INVENTION

The present invention provides a new and improved software interface as a layer between application developers and the graphics pipeline that renders and processes the graphics data.

BACKGROUND OF THE INVENTION

For the vast majority of applications, application programmers rely on or utilize some form of software interface to interact with a computer and its associated devices. For graphics applications, developers or programmers typically utilize a graphics software interface, such as a 3D graphics application programming interface (API), to facilitate the interaction with constituent parts of a graphics system. Programmers typically rely on software interfaces to peripherals and devices so that they can focus on the specifics of their application rather than on the specifics of controlling a particular device and so that their efforts are not duplicated from application to application. However, even after generations of software interfaces, there are certain aspects of today's software interfaces that do not provide the level of performance desired and thus can be improved.

There are several reasons why previous generation graphics software interfaces do not meet the needs of today's graphics applications and systems. One type of resource contention issue that sometimes occurs is due to the demands of multiple devices and applications requiring graphics system resources simultaneously. For example, if multiple applications running simultaneously are maintaining connections to multiple surfaces from various objects of the graphics system, sometimes these connections to surfaces can become severed or disconnected. When multiple applications have connections between surfaces and objects, more system resources, such as memory space, are utilized resulting in an increased likelihood of a disconnection. For instance, while a user may generally toggle back and forth between executing applications, if the connection to surface memory for any one application is severed, a user may have to restart the application or begin certain portions of the application again in order to recreate a proper connection. Today's 3D graphics APIs check for severing of connections in a redundant fashion, wasting computing resources, and consequently there is a need for an improved technique for checking for the persistence of connections between object space and surface space.

Another reason why previous generation graphics software interfaces are inadequate is that versioning itself can create problems when each version is not rewritten from scratch, as is often the case. As any software developer has encountered, the subsequent versioning of a software product to meet the ad hoc needs of an evolving operating environment produces a scenario where once separate or merely related modules may be more efficiently placed together, rewritten or merged. A software interface between graphics application developers and rapidly evolving hardware is no less a product. For example, graphics APIs have undergone multiple evolutions to arrive at the current state of the art of graphical software interfacing. In some cases, this in turn has caused current versions of the API code to become unwieldy to developers. For example, the 3D graphics world has grown exponentially in the last decade, while the procedures for 2D applications have largely stayed the same. Initially, there was only an API that helped developers render 2D images, and while at its inception, the API was a revolutionary innovation freeing developers to create games and other 2D graphics applications, the algorithms for the creation, processing and rendering of pixels and polygons in 2D space have been largely static in recent years. On the other hand, the algorithms for the creation, processing and rendering of 3D objects on a 2D display space have grown considerably. While the creation, processing and rendering of 3D objects by a 3D API utilizes algorithms and function calls of the 2D API, a single set of APIs does not exist for the purpose of creating both 2D and 3D objects. There are thus typically multiple choices for a developer to make, when creating, processing or rendering an object, because there are multiple roads to the same result depending upon which API function calls are utilized to achieve the result.

For yet another example, there are three ways for a developer to perform a texture download depending upon the hardware involved, wherein data is transferred from the system memory surface to the display memory surface. It would be desirable to provide a single fast texture download. There are thus situations where the number of mappings from an application to various API objects is diverse, whereby multiple commands perform the same or similar actions. In essence, there is an overlapping of functionality among API objects that is not exploited. It would thus be desirable to centralize this diversity and provide a unified singular command structure, thereby reducing the number of diverse, and potentially redundant, mappings to API objects.

In addition, there are a number of instances in which existing 3D graphics APIs inconvenience the developer by requiring the developer to write substantially more complex code than is necessary in view of today's computing environments. For example, currently it requires at least five programming steps to effect a resolution change, inconveniencing the developer each time a resolution change is desired. While coding five steps is still better than interfacing directly with graphics system components, it would still be desirable to provide a single command to effect a resolution change. Thus, there are a variety of instances in which it would be desirable to unify existing API command structures into concrete, atomic algorithmic elements that ease the task of development.

Since graphics peripherals and other specialized graphics hardware and integrated circuits (ICs) are generally designed for specific tasks, they are much better than the host processor at performing certain types of functions. For example, a video card may have special purpose hardware that can copy or process pixels much faster than the CPU. A high level interface using a multi-purpose processor may not take advantage of the specialized functionality and may also include additional lines of code that in the long run can consume valuable computer resources, especially when repeated over and over as can be the case with graphics applications. Thus, one of the problems with current 3D graphics architectures is an over-reliance on general host computing resources. This over-reliance on general processing has led to major advances in specialized graphics chips designed primarily for the purpose of improving the performance of graphics applications.

Other failings in today's graphical software interfaces are due to advances in hardware technology that have enabled the ability to move functionality previously implemented in software into specialized hardware. An example of this is the way in which graphics rendering and processing functionality has been merged or pushed into specialized graphics hardware that can operate, on average, at orders of magnitude faster than previous generations. In the last two years, graphics hardware has been matching or beating the expectations of Moore's law, creating a whole new universe of high performance devices and 3D graphics chips that can perform specialized tasks at previously unheard of rates and efficiency. This in turn has left pre-existing software interfaces lagging behind the functionality of the hardware devices and the graphics community, and in certain cases, the software interfaces are currently limiting this increased hardware functionality. This can be the case, for example, when the execution of the commands of the software interface becomes the rate determining step of a graphics operation that could otherwise be performed more efficiently with hardware. Thus, in addition to the problems identified above, it would be desirable to address with software solutions the increased functionality of today's graphics hardware at various points between developers, the 3D graphics API and the new hardware.

For example, in the past, when a developer switched graphics data from one memory location to another, the developer had to deal with switching the data i.e., by destroying and recreating the data. In this regard, there are two types of 'containers' that today's graphics APIs present to a developer for use: one for pixels and one for polygons. Essentially, by passing arguments to the graphics API (placing data into the containers), the developers can manipulate and render various chunks of data. Once these containers are filled with data, there are various places, such as system memory or on a 3D card or chip, where this data may be stored for further manipulation. The filling and placement of the containers is achieved via various components or function calls of the graphics API. The decision as to where to place this data is generally a performance issue. Data for which fast access is not necessary can be stored in system memory, whereas data for which speed of access is more important may be stored on a graphics chip designed for ultra fast access.

As mentioned, it is sometimes desirable for a developer to switch data or chunks of data from one memory location to another memory location at different stages of processing. In the past, when a developer desired to switch data from one memory location to another, the developer had to deal with switching the data i.e., destroying the data in the old location and recreating the data in the new location. Previously, this may not have caused a performance decrease because, relative to today, the bandwidth for high performance processing on a graphics board or chip was low. This may have actually given the developer more flexibility to place data in an environment in which it would be processed most efficiently. With limited options, this task was not overly burdensome even though the developer had to custom code the switching of data for each application.

Given the complexity and high performance rewards of using today's hardware, which may have their own memory on board or on chip, it would be advantageous to be able to automatically transition data objects between memory types to enable the seamless switching of data. It would in theory be desirable to keep all data on the faster hardware chip memory to process data. However, in reality, there is little room for such on chip graphics data, sometimes as few as a hundred (high speed) registers. Thus, typically a cache managing algorithm optimizes the tradeoff between host system memory and video memory on the 3D card or chip so as to keep a maximum amount of data for processing in graphics hardware memory without causing overflow. Previously, a developer would have to write such a cache managing algorithm for every application and the cache managing algorithm would have to be individually tailored to the programming task at hand. Thus, it would be desirable to enable the software interface to hide the optimal cache managing algorithm from the developer so that the developer need not be concerned with the optimal tradeoff of system resources, and so that efficient switching of data can take place behind the scenes, thereby simplifying the developer's task.

Another area in which such a software solution is desirable in view of today's graphics devices lies in the transmission of graphics data to specialized graphics ICs and other specialized devices. For example, as mentioned, there are two types of data containers, pixel and polygon, that a developer may fill with data objects for further operation and processing. These containers correspond to data structures or formats that graphics modules, ICs and devices have come to expect for the processing and storage of graphics data, such as pixels and polygons. Currently, when a developer goes about specifying multiple data objects to fill multiple containers, these data objects are fed to a 3D chip one by one, or in a serial fashion. Thus, currently, developers are not able to feed graphics data objects in parallel to a 3D chip for processing and yet today's 3D graphics chips have evolved to function upon and/or store multiple data objects simultaneously.

Another area in the graphics world that has rapidly evolved is in the area of procedural shading. Vertex and pixel shaders, which may be implemented with software or hardware or with a combination of both, have specialized functionality that enables the processing of pixels or vertices, so as to perform lighting operations, and other transformations upon graphics data. Vertex and pixel shaders are two types of procedural shaders that are currently implemented in specialized graphics ICs.

With current 3D APIs, the API does not provide packaged operations to be performed in connection with procedural shaders, such as vertex and pixel shaders. Invariably, a developer designs these procedural shader algorithms from scratch for each application. While there may be some crossover from application to application, the bottom line is that a developer has to implement these algorithms each time for a new application. Thus, while the core commands for use with the procedural shaders are available to the developer, the effective or efficient combination of those commands is left to the developer. Consequently, algorithms that are unique, common and useful in connection with typical 3D graphics processes, such as algorithms that are typically used in connection with procedural shaders, are designed from the ground up for each application. Conceptually, these elements for acting on procedural shaders have been customized by necessity and thus provided 'above' the API. With present procedural shader hardware designs, for example, a specialized set of assembly language instructions has been developed, which in part replaces or duplicates some of the custom coding currently implemented by the developer. However, there is no mechanism that exposes to the developer unique algorithmic elements for use with procedural shaders via a mechanism that is conceptually below or inside the software interface.

As is apparent from the above, advances in hardware and graphics algorithms have been revolutionizing the way graphics platforms operate. Generally speaking, however, current 3D graphics chips on the market are rigid in design and have very little flexibility in terms of their operation diversity. For example, while they provide high performance for certain operations, current chips do not necessarily have the flexibility to alter their operation via software. While EEPROM technology and the like has existed for sometime where the operation of a chip can be programmably reset, the logic of graphics chips has been typically preset at the factory. However, there are innumerable circumstances where it is desirable to take operations previously customized by a developer for an application, and make these operations downloadable to a 3D chip for improved performance characteristics. As cutting edge 3D graphics chips, still being designed in some cases, have begun to handle such programmable functionality, by including flexible on chip processing and limited on chip memory, to remove custom graphics code from the processing of the host processor and to place such programmable and downloadable functionality in a graphics chip would be of key importance in future graphics platforms. Thus, there is a need for an API that provides this ability to have a programmable 3D chip, wherein programming or algorithmic elements written by the developer can be downloaded to the chip, thereby programming the chip to perform those algorithms at improved performance levels. Related to this case where a developer may write a routine downloadable to the 3D chip, there are also a set of algorithmic elements that are provided in connection with the 3D API (routines that are not written by the developer, but which have already been programmed for the developer). Similarly, it would be desirable to be able to download these API algorithms to a programmable 3D chip for improved performance. It would thus be advantageous to have the ability to download 3D algorithmic elements to provide improved performance, greater control as well as development ease.

While 3D graphics chips are currently undergoing improvements, there are also improvements taking place on the display side of the API i.e., once data has been processed, the API facilitates the transfer of graphics data to the rasterizer. The rasterizer is a specialized display processor chip that, among other things, converts digital pixel data into an analog form appropriate for a display device, such as a monitor. While direct video memory access was previously a possibility, it is no longer a possibility, due to faster techniques employing specialized hardware. Currently, specialized or private drivers and surface formats are used in connection with very fast graphics accelerators. With direct rasterizer/processor access to display memory surfaces, "chunks" of surfaces can be moved around according to the specialized surface format, and pulled for processing as efficiency dictates. Thus, the pipeline between display memory surface space and the display itself has been made more efficient, but there currently is no mechanism that makes these direct rasterizer/processor memory access techniques seamless to the application developers via a graphics API whose applications ultimately benefit from the efficiencies of display surface data chunk manipulation.

Thus, as a consequence, the graphics APIs used as the layer that insulates game developers from the details of these changes also need to be changed to be in line with the changes in hardware. When implemented efficiently, these changes can create noticeable differences in the ease and robustness with which APIs may be used by game or other graphics developers. Additionally, the advances in hardware create an opportunity to simplify some processes by increasing maintainability, decreasing memory consumption and providing greater usability of the 3D rendering and processing pipeline.

It would be advantageous to provide an optimization that allows a developer coding an application to specify the transmission of multiple data objects, wherever originated or located at the time of operation, to a 3D chip simultaneously or in parallel. Because graphics ICs have evolved to possess functionality wherein data objects can be processed in parallel, it would be desirable to expose this functionality to developers, thereby allowing developers to specify multiple data objects upon which operations are to be performed simultaneously.

In view of the above problems, it would be beneficial to prevent the severance of connections between surfaces and objects when multiple applications maintain connections to surface memory space. It would be desirable to unify existing API command structures into concrete, atomic algorithmic elements to enable greater development ease. It would be advantageous to be able to automatically transition data objects between memory types to enable the seamless switching of data. It would be further beneficial to be able to feed graphics data objects in parallel to a 3D chip for processing. It would be further advantageous to have the ability to download 3D algorithmic elements to a 3D graphics chip. It would be still further beneficial to make today's direct rasterizer/processor memory access techniques seamless to the application developers via a graphics API. It would be yet further advantageous to leverage the algorithmic components used for procedural shader operations provided by today's procedural shaders by exposing the components to the developer via the software interface.

SUMMARY OF THE INVENTION

In view of the foregoing, the present invention provides a method and system for controlling the algorithmic elements in 3D graphics systems via an improved 3D graphics API. More particularly, the present invention is directed to an API that enables programmability of a 3D chip, wherein programming or algorithmic elements written by a developer can be downloaded to the chip, thereby programming the chip to perform those algorithms.

According to aspects of the invention, 3D algorithmic elements written by a developer can be downloaded to the 3D chip for improved performance characteristics. A developer writes a routine that may be downloaded to the 3D graphics chip. There are also a set of algorithmic elements that are provided in connection with the API of the present invention (routines that do not have to be written by developer, but which have already been programmed for the developer), that are downloadable to the programmable chip for improved performance. A developer may download preexisting API objects to the 3D graphics chip.

In an exemplary embodiment of the present invention, a developer adheres to a specific format for packing up an algorithmic element, or set of instructions, for implementation by a 3D graphics chip. The developer packs the instruction set into an array of numbers, by referring to a list of 'tokens' understood by the 3D graphics chip. This array of numbers in turn is mapped correctly to the 3D graphics chip for implementation of the algorithmic element by the 3D graphics chip.

According to another embodiment of the present invention, a specialized set of instructions, or list of tokens packed as an array of numbers, can be combined in such ways as to create useful algorithmic elements. The present invention takes these useful combinations and exposes the algorithmic elements to the developer by way of the API. Conceptually, therefore, the present invention provides these useful algorithmic elements for acting on procedural shaders below or inside the API. The present invention provides API objects, which are useful combinations of a procedural shader's instruction set for acting upon the shader. In this fashion, algorithmic elements for use with a procedural shader are exposed to the developer.

Other features of the present invention are described below.

BRIEF DESCRIPTION OF THE DRAWINGS

The system and methods for controlling the 3D algorithmic elements in a 3D computer graphics system are further described with reference to the accompanying drawings in which:

FIG. 4A illustrates the unification of 2D and 3D graphics APIs in accordance with the present invention;

FIG. 4B illustrates various ways in which applications could perform a texture download in accordance with prior 3D graphics APIs;

FIG. 4D illustrates various ways in which applications could perform a resolution change in accordance with prior 3D graphics APIs;

FIG. 4E illustrates a single function by which applications perform a resolution change in accordance with the 3D graphics API of the present invention;

DETAILED DESCRIPTION OF ILLUSTRATIVE EMBODIMENTS

Overview

The present invention provides a new and improved API as a layer between application developers and the current state of the art of graphics hardware and the pipeline that renders and processes the graphics data. An API is provided that enables programmability of a 3D chip, wherein programming or algorithmic elements written by the developer can be downloaded to the chip, thereby programming the chip to perform those algorithms. A developer writes a routine that is downloadable to a 3D graphics chip. There are also a set of algorithmic elements that are provided in connection with the API that have already been programmed for the developer, that are downloadable to the programmable chip for improved performance. Thus, a developer may download preexisting API objects to a 3D graphics chip. A developer adheres to a specific format for packing up an algorithmic element, or set of instructions, for implementation by a 3D graphics chip. The developer packs the instruction set into an array of numbers, by referring to a list of 'tokens' understood by the 3D graphics chip. This array of numbers in turn is mapped correctly to the 3D graphics chip for implementation of the algorithmic element by the 3D graphics chip.

Exemplary Computer and Network Environments

Figure 1:
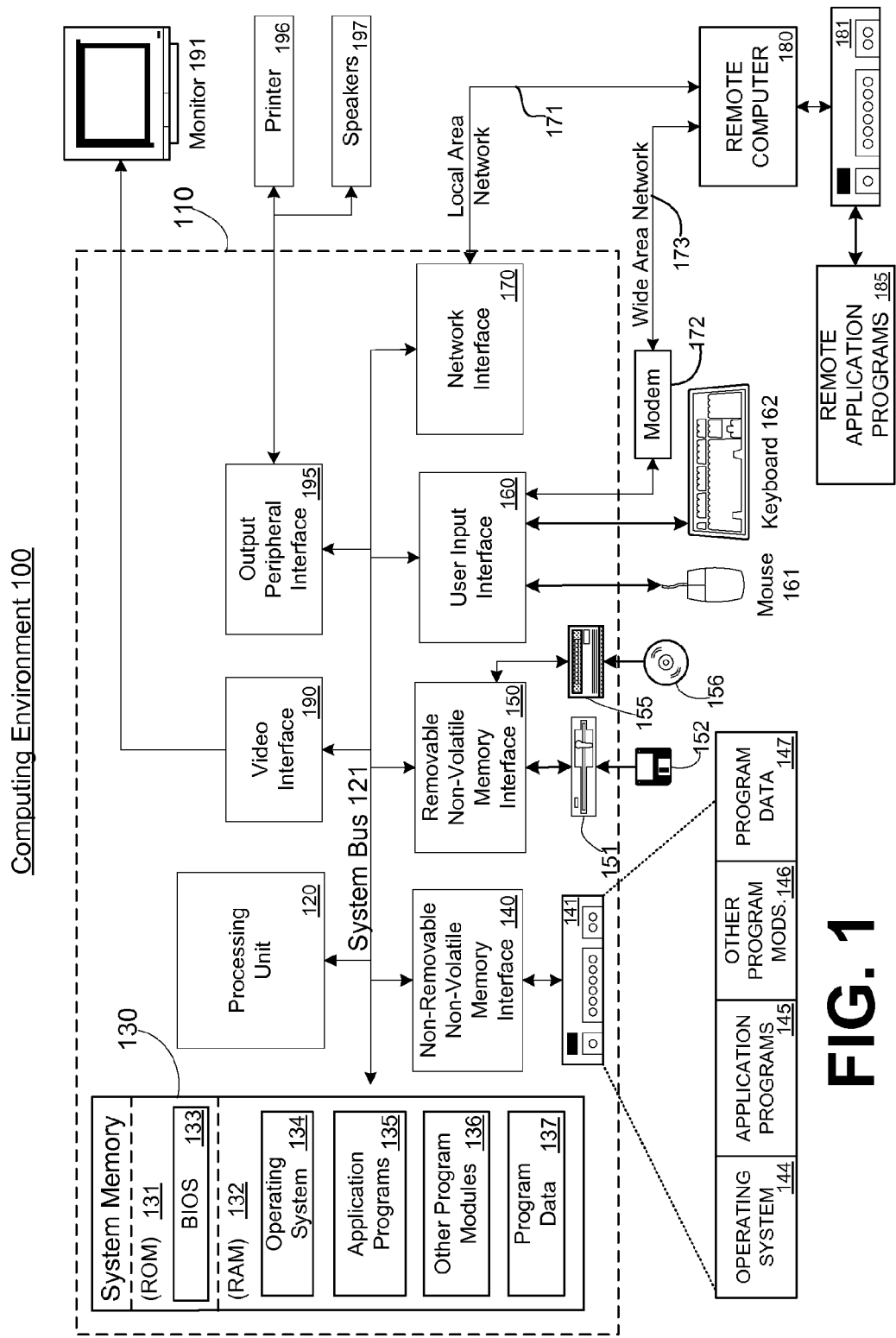
FIG. 1 is a block diagram representing a suitable computing system environment in which the present invention may be implemented.

FIG. 1 and the following discussion are intended to provide a brief general description of a suitable computing environment in which the invention may be implemented. Although not required, the invention will be described in the general context of computer-executable instructions, such as program modules, being executed by one or more computers, such as client workstations, servers or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations. Other well known computing systems, environments, and/or configurations that may be suitable for use with the invention include, but are not limited to, personal computers (PCs), server computers, hand-held or laptop devices, multi-processor systems, microprocessor-based systems, programmable consumer electronics, network PCs, minicomputers, mainframe computers, gaming platforms and the like. The invention may also be practiced in distributed computing environments where tasks are performed by remote processing devices that are linked through a communications network or other data transmission medium. In a distributed computing environment, program modules may be located in both local and remote computer storage media including memory storage devices.

FIG. 1 illustrates an example of a suitable computing system environment 100 in which the invention may be implemented. The computing system environment 100 is only one example of a suitable computing environment and is not intended to suggest any limitation as to the scope of use or functionality of the invention. For example, graphics application programming interfaces may be useful in a wide range of platforms. Neither should the computing environment 100 be interpreted as having any dependency or requirement relating to any one or combination of components illustrated in the exemplary operating environment 100.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Figure 2:
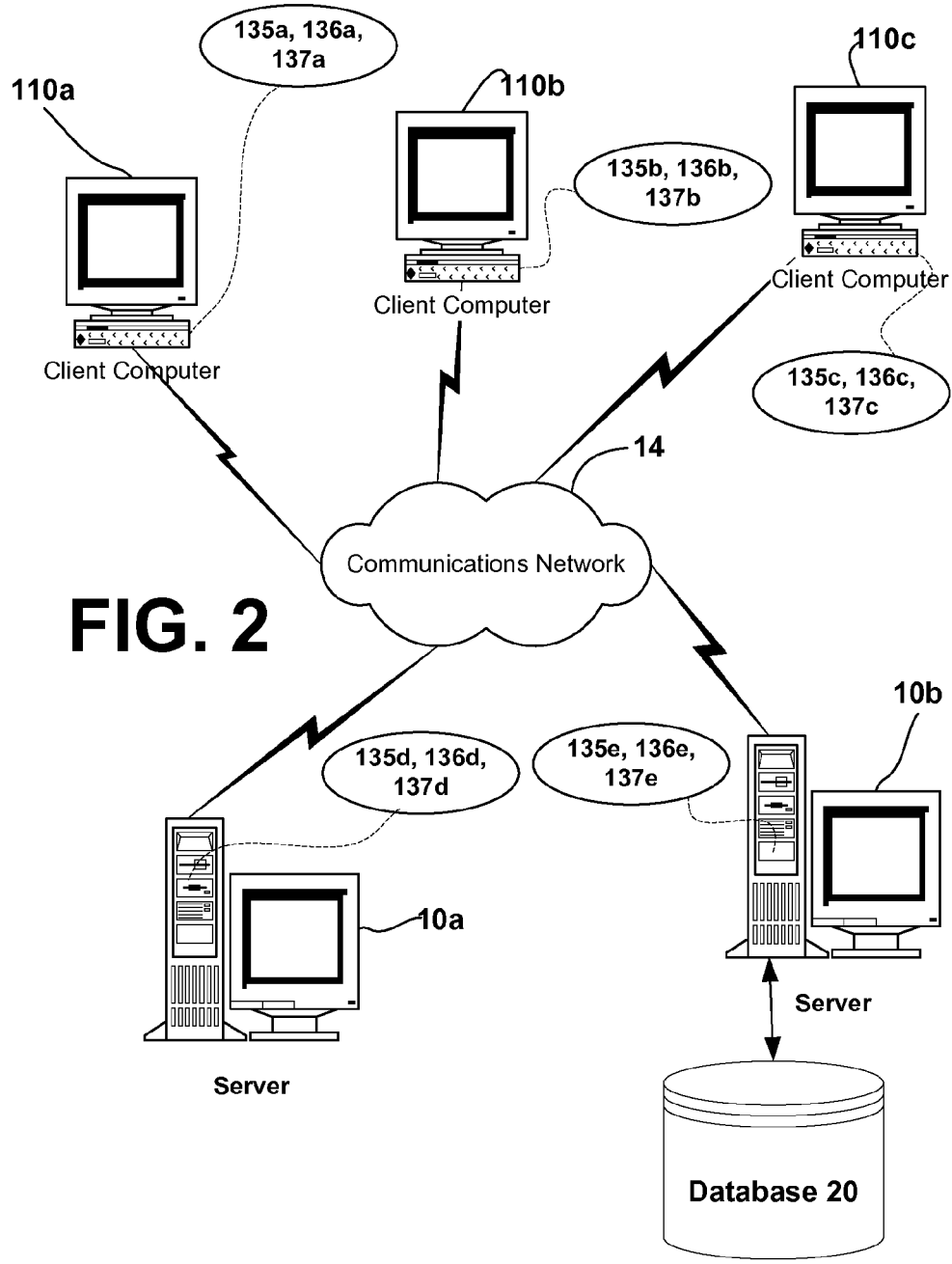
FIG. 2 is a block diagram representing an exemplary network environment in which the present invention may be implemented.

As mentioned, a computer, such as described above, can be deployed as part of a computer network. Further, the present invention pertains to any computer system having any number of memory or storage units, and any number of applications and processes occurring across any number of storage units or volumes. Thus, the present invention may apply to both server computers and client computers deployed in a network environment, having remote or local storage. More and more, graphics applications are becoming deployed in network environments. FIG. 2 thus illustrates an exemplary network environment, with a server in communication with client computers via a network, in which the present invention may be employed. As shown, a number of servers 10a, 10b, etc., are interconnected via a communications network 14 (which may be a LAN, WAN, intranet or the Internet) with a number of client computers 110a, 110b, 110c, etc. In a network environment in which the communications network 14 is the Internet, for example, servers 10 can be Web servers with which the clients 10a, 10b, etc. communicate via any of a number of known protocols such as hypertext transfer protocol (HTTP). The invention may also leverage peer to peer networking techniques. Each client computer 110 and server computer 10 may be equipped with various application program modules 135, other program modules 136 and program data 137, and with connections or access to various types of storage elements or objects, across which files may be stored or to which portion(s) of files may be downloaded or migrated. Each client computer 110 and server computer 10 may also be connected to additional storage elements 20, such as a database. Thus, the present invention can be utilized in a computer network environment having client computers for accessing and interacting with a network and server computers 10a, 10b, etc. for interacting with client computers.

Maintenance of Connection Between Surfaces and Objects

As mentioned in the background, a resource contention issue sometimes occurs due to the demands of multiple devices and applications requiring graphics system resources simultaneously. Current 3D graphics APIs sometimes improperly manage resources such that if multiple applications running simultaneously are maintaining connections to multiple surfaces from various objects of the graphics system, sometimes these connections to surfaces can become severed or disconnected. If the connection to surface memory for any one application is severed, a user may have to restart the application or begin certain portions of the application again in order to recreate a proper connection.

Figure 3A:
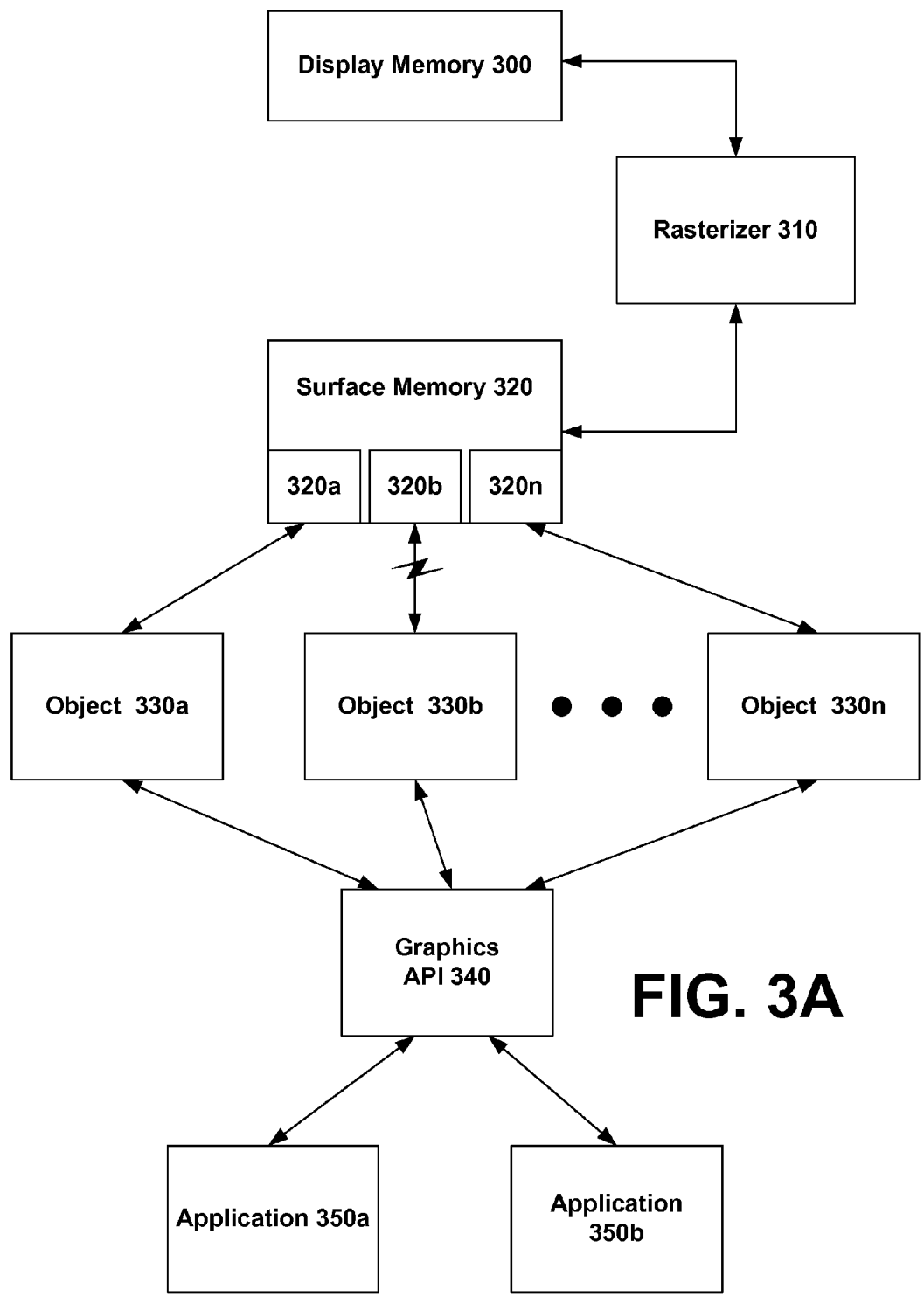
FIG. 3A is a block diagram illustrating various connections between surfaces and objects in a graphics system running multiple applications simultaneously, wherein a connection may be lost.

FIG. 3A illustrates some elementary components of a 3D graphics system. A rasterizer 310 processes graphics data from surface memory 320 in preparation for its transmission to a display device having display memory 300. Any number of objects 330a, 330b to 330n may be created through graphics API 340 when applications 350a and 350b or more are running. Objects 330a, 330b to 330n may be part of the graphics API 340 or may be provided separately for use with the graphics system. As FIG. 3A illustrates, a connection between surface space 320 and, for example, object 330b may become severed due to improper maintenance of system resources when performing thousands of high speed operations for multiple applications. For example, some objects are responsible for building and moving frames to surface space. Over the course of operation of a graphics application, thousands and thousands of such build and move operations may take place. Presently, there is only one point in the API code that performs a 'check' to see if the connection is properly maintained to achieve such operations. Previously, during the course of building, processing and presenting frame data, multiple checks were performed, essentially each time any operation occurred with respect to the data. This, however, is wasteful of computing resources in the event that a connection is lost since each check consumes computing resources on its own.

Figure 3B:
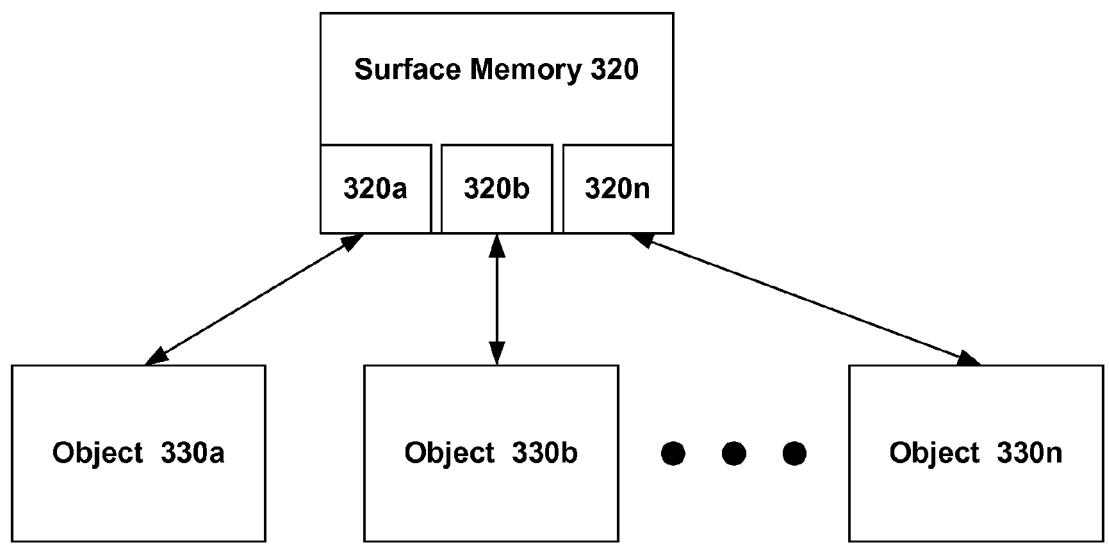
FIG. 3B is a block diagram illustrating various connections between surfaces and objects in a graphics system running multiple applications simultaneously wherein the connections are preserved according to the present invention.

In accordance with the present invention, by performing a check and monitoring connections and system resources each time a frame is presented, the consumption of valuable resources between present operations according to various operations is avoided. As shown in FIG. 3B, the connection between surface 320b and object 330b is treated as if it persists between present operations in accordance with the present invention, even where the connection has been lost. For example, where a typical check for the persistence of the connection between surfaces and objects includes returning a flag, such as true or false, depending upon the whether the connection persists, these operations may be skipped or spoofed such that between present operations, the flag continues to indicate that the connection persists, even if it has been lost, thus avoiding multiple, redundant checks for the persistence of the connection. As a result, operations are streamlined between present calls such that checks are made when expedient to do so. Thus, the present invention prevents wasteful consumption of computing resources due to the loss of connection between surfaces and objects when multiple devices and applications demand premium system resources simultaneously.

In an exemplary embodiment, the present invention provides a solution by unifying the command structure that previously checked for lost connections to surfaces. Previously, there were innumerable places where the application checked for and handled resource issues between present calls. This distributed the checkpoints and created multiple, if not hundreds or thousands of places throughout the application where checks occurred between present calls, creating inefficiencies and further opportunities for error due to wasteful devotion of computing resources. In accordance with the present invention, each time data is 'presented' to the surface memory space 320 according to a 'present' function call, the 3D API of the invention checks for these resource contention issues. Thus, instead of having many different cases occurring at different times for which the API might determine that a connection has been lost, the 3D API of the invention checks each time a 'present' function call is made, thereby providing a single case for a lost connection such that resources may be newly allocated according to the same unified procedure. This check may be performed before or after the present call, or included therein. It can be appreciated that any call, such as a present function call, that is cyclical and occurs once per frame e.g., at a typical 30 or 60 frames per second, or other recurring event may also be utilized to achieve the above goals.

Unification of Previous API Command Structure into Concrete Algorithmic Elements The subsequent versioning of a software product to meet the needs of an evolving operating environment sometimes results in inefficiencies wherein once separate or merely related modules may be more efficiently placed together, rewritten or merged. Thus, the present invention unifies existing API command structures into concrete, atomic algorithmic elements that ease the task of development.

For example, while the creation, processing and rendering of 3D objects by a 3D API utilizes algorithms and function calls of the 2D API, a single set of APIs does not exist for the purpose of creating both 2D and 3D objects. There are thus typically multiple choices for a developer to make, when creating, processing or rendering an object, which makes the developer's work more complex. For example, with reference to FIG. 4A, there are numerous instances where the current 2D graphics API shares functionality with the current 3D graphics API, because, for example, both include the same function calls. There are also instances wherein to perform a function 410a with the 3D graphics API 410 may involve a function call to function 400a of the 2D graphics API, and vice versa. While the overlap in the figure is illustrated simply with dashed lines, the reality of current interoperation is far from simple, and leaves the developer with too many choices. The present invention thus provides a single 2D and 3D graphics API, providing a unified programming body with which developers may work.

Currently, there are no 3D graphics APIs that unify 2D and 3D graphics data types. Historically, due to the evolution of 2D and 3D graphics processing, with 'modern' 2D graphics applications beginning as early as the 1970s and with 3D graphics applications developing in parallel fashion at a later time, 2D and 3D data types have simply been treated differently by different applications i.e., memory allocation, memory structures and memory management have been different as between 2D and 3D data types. Thus, because the present invention unifies data types and choices with respect to 2D and 3D data types, memory management techniques have been unified in accordance with the present invention, eliminating ad hoc memory management based on whether the data was a 2D data type or a 3D data type. Due to the unification of 2D and 3D data formatting, the definition of data is simplified from the perspective of the developer. Thus, a long felt need in the art for a unified 2D and 3D API is addressed by the present invention.

In the above scenario, there is an overlapping of functionality among API objects that is not exploited. There are also other instances in which the number of choices available to developers for the same or similar functionality can both complicate the development process and create a source of inefficiency. For instance, there are three ways for a developer to perform a texture download depending upon the hardware involved, wherein data is transferred from a system memory surface to a 3D display memory surface. Textures are rectangular arrays of colored pixels, which tend to be square in graphics applications, and when processed in quantity, represent a lot of data. A texture download, in this regard, is important because ultimately slow texture downloading can become a bottleneck in graphics data processing. Different texture downloads, depending on the hardware used incident thereto, have different data transfer rates associated therewith and thus the choice of texture download made by the developer can affect the overall system performance. The optimization of this data transfer rate, if required of the developer, can involve considerable time, effort and skill.

Figure 4C:
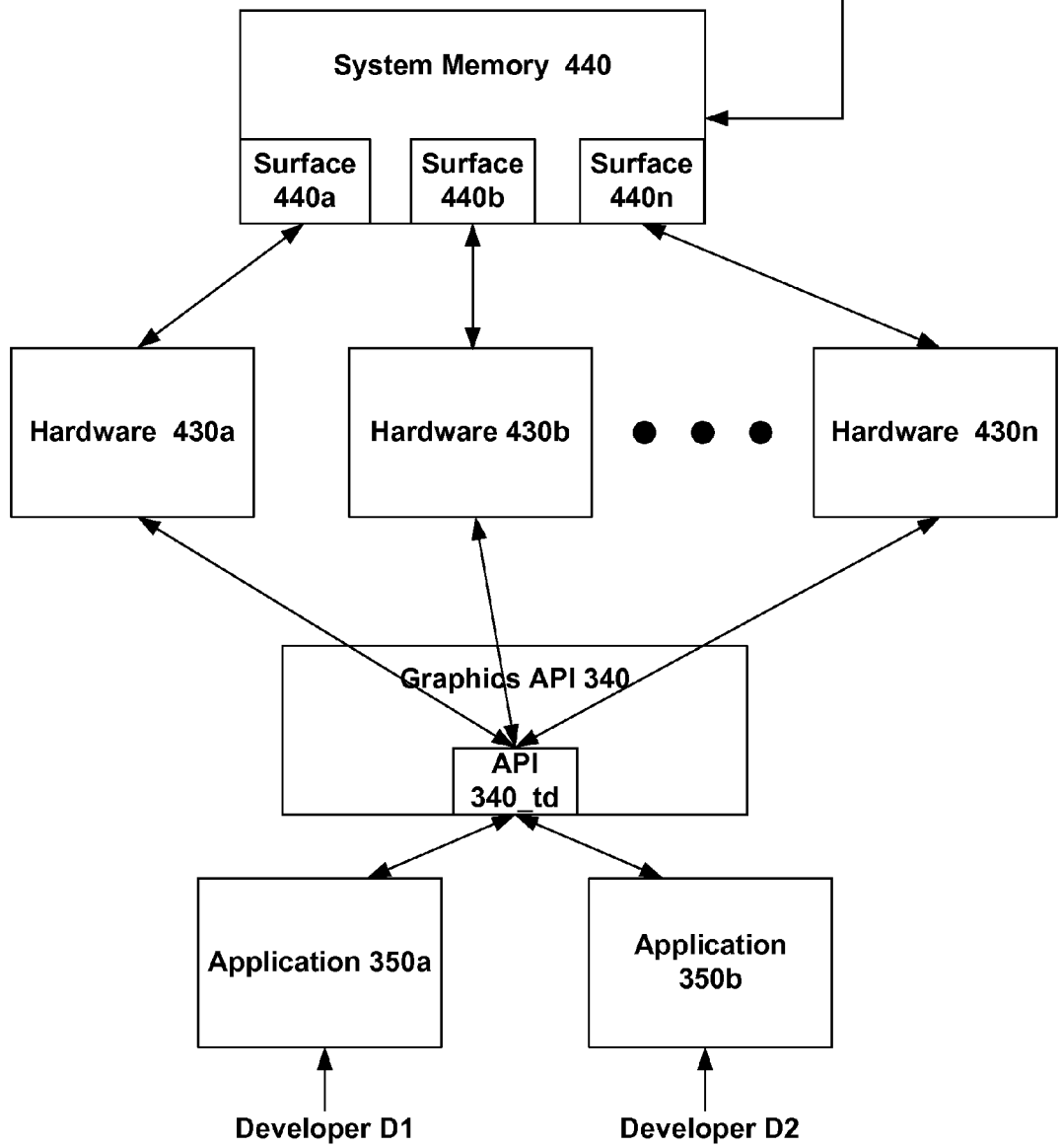
FIG. 4C illustrates a single way in which applications perform a texture download in accordance with the 3D graphics API of the present invention.

As illustrated in FIG. 4B, three different functions or ways 340a, 340b and 340c of graphics API 340 are currently available to a developer for use in connection with a texture download depending upon which hardware 430a, 430b ... 430n is involved. When multiple hardware 430a, 430b ... 430n is present, and a developer has three choices to make regarding texture downloading data from a system memory surface 440a, 440b ... 440n to 3D display memory surface 450, the decision is undesirably time-consuming, complex and requires an understanding of the underlying hardware in order to make efficient decisions. The present invention thus provides a single fast texture download. Instead of having a plurality of mappings from an application to API objects, and multiple commands that perform the same or similar actions, the present invention provides a single mapping. The present invention thus centralizes the diversity of current texture downloads and provides a unified singular command structure, thereby reducing the number of diverse, and redundant, mappings to API texture downloads. Instead of choosing among API objects 340a, 340b or 340c of FIG. 4B, or a combination thereof, or having to write an optimization routine that optimizes the use of 340a, 340b or 340c, the present invention provides a single texture download object 340_td for use by the developer, as shown in FIG. 4C.

Optimization of graphics components used incident to a texture download, such as hardware 430a, 430b, ... 430n, is thus performed by the API object 340_td in accordance with the present invention, thereby freeing the developer to be concerned with other aspects of the graphics application. For example, according to one optimization, the number of times used and order of hardware components 430a, 430b, etc. utilized in connection with a texture download is hidden from the developer. For example, in one embodiment, object 340_td keeps track of how well the hardware objects 430a, 430b, etc. are keeping up in terms of free memory (capacity) and speed of data processing and transfer. This may be configured statically beforehand, so as to control the number and order of hardware components 430a, 430b, etc. that may be used and in connection with a texture download, or this may be performed dynamically based upon an evaluation of the performance of texture downloading, with feedback from the hardware components 430a, 430b, etc.

In addition, there are a number of instances in which existing 3D graphics APIs inconvenience the developer by requiring the developer to write substantially more complex code than is necessary in view of today's computing environments. For example, currently it requires at least five programming steps to effect a resolution change, inconveniencing the developer each time a resolution change is desired. While coding five steps is still better than interfacing directly with graphics system components, the present invention unifies the command structure of a resolution change, allowing a developer to effect a resolution change with a single API command. The present invention thus provides a single command to effect a resolution change, insulating the developer from the detailed changes that are made in the graphics system in order to effect the change. This is yet another example where current graphics APIs require the developer to have an overly detailed understanding of the underlying graphics hardware. As shown in FIG. 4D, there are currently five steps or commands 340_rc1, 340_rc2, 340_rc3, 340_rc4 and 340_rc5 that a developer D1 must enter in order to effect a graphics system resolution change RC. Each of commands 340_rc1, 340_rc2, 340_rc3, 340_rc4 and 340_rc5 has an independent bearing on the graphics system which can involve overlapping functionality or redundant arguments. Thus, as FIG. 4E illustrates, the present invention provides a single efficient API object 340_rc to achieve a resolution change. Thus, in these and other instances, the present invention unifies existing API command structures into concrete, atomic algorithmic elements that ease the task of development for a developer.

Downloading of 3D Algorithmic Elements to 3D Chip and Unique Algorithmic Elements for use with Procedural Shaders The API of the present invention enables programmability of a 3D chip, wherein programming or algorithmic elements written by the developer can be downloaded to the chip, thereby programming the chip to perform those algorithms.

Thus far, the functionality of 3D hardware chips or components has been relatively fixed from the vantage point of the developer, leaving little flexibility at the developer end to perform efficient sets of operations that are tailored to an application or that allow the developer to control the algorithmic elements that are performed by the 3D graphics chip. There are innumerable circumstances where the state of the art of graphics hardware has made it desirable to take operations previously customized by a developer for an application, and make these operations downloadable to a 3D chip for improved performance characteristics. Since 3D graphics chips have evolved to be very high performance compared to host system processing space, it would be advantageous to allow a developer to download functionality to the 3D chip.

Figure 5:
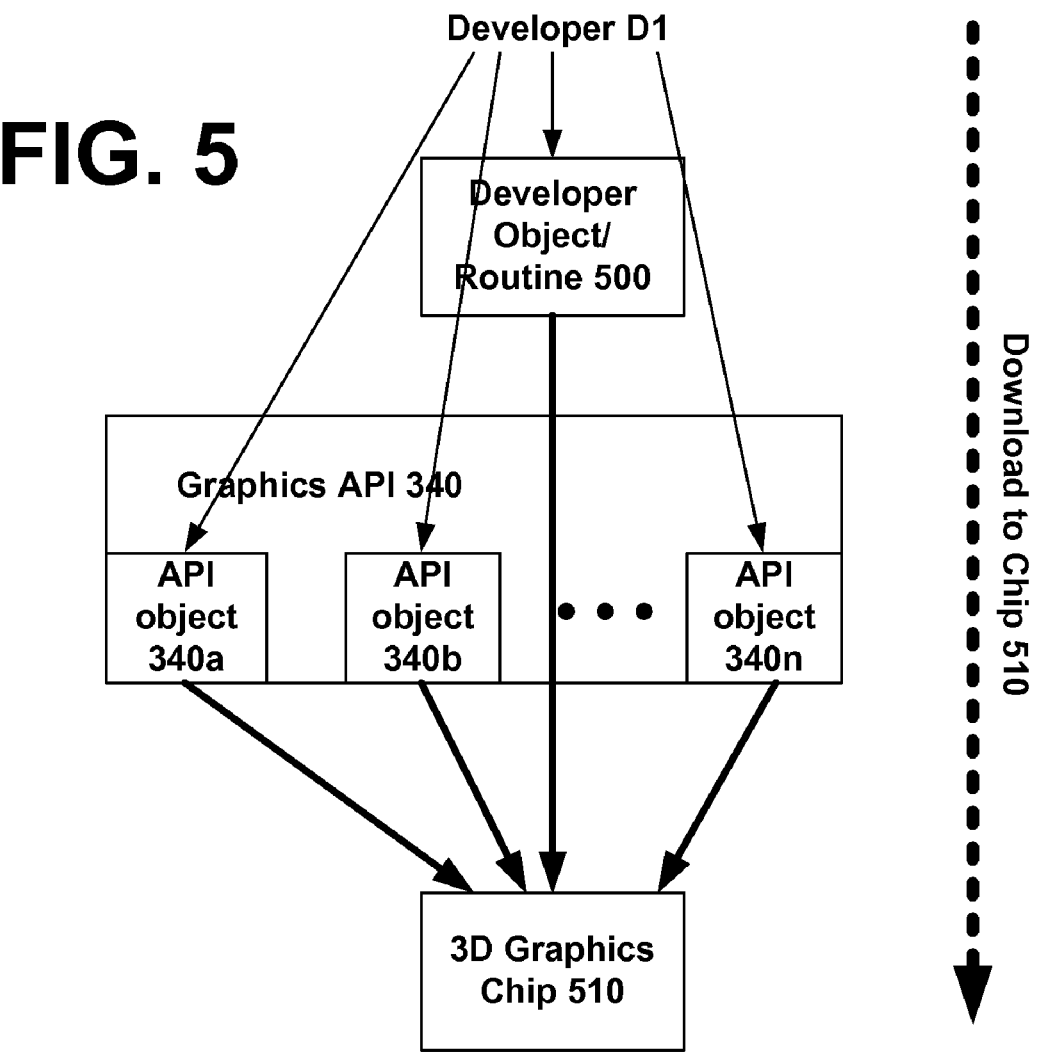
FIG. 5 illustrates the downloading of specialized graphics functions to a 3D graphics chip in accordance with the 3D graphics API of the present invention.

Thus, by way of the API of the present invention, 3D algorithmic elements written by a developer can be downloaded to the 3D chip for improved performance characteristics. FIG. 5 illustrates this process whereby a developer D1 writes a routine 500 that may be downloaded to 3D graphics chip 510. Similar to this case where a developer may write a routine 500 downloadable to the 3D chip 510, there are also a set of algorithmic elements that are provided in connection with the API of the present invention (routines that do not have to be written by developer D1, but which have already been programmed for the developer D1), that are downloadable to the programmable chip 510 for improved performance. As shown in FIG. 5, a developer D1 may download preexisting API objects 340a, 340b, . . . 340n to 3D graphics chip 510. While graphics applications generally involve a performance specification that includes fast processing and fast rendering, the ability to control 3D algorithmic elements in this fashion is very advantageous, because it allows a developer access to the fastest, highest performance portions of the graphics processing system, enabling the developer to download efficient algorithmic elements to the graphics chip 510 that are tailored to the application at hand.

In an exemplary embodiment, a developer adheres to a specific format for packing up an algorithmic element, or set of instructions, for implementation by a 3D graphics chip. The developer packs the instruction set into an array of numbers, by referring to a list of 'tokens' understood by the 3D graphics chip. This array of numbers in turn is mapped correctly to the 3D graphics chip for implementation of the algorithmic element by the 3D graphics chip. Further background, hereby incorporated by reference in its entirety, may be found in U.S. Pat. No. 6,819,325 entitled "API Communications For Vertex And Pixel Shaders" having inventors Boyd and Toelle.

With respect to unique algorithmic elements for use with procedural shaders in accordance with the present invention, some general background is instructive: rendering and displaying three dimensional graphics typically involves many calculations and computations. For example, to render a three dimensional object, a set of coordinate points or vertices that define the object to be rendered must be formed. Vertices can be joined to form polygons that define the surface of the object to be rendered and displayed. Once the vertices that define an object are formed, the vertices are transformed from an object or model frame of reference to a world frame of reference and finally to two dimensional coordinates that can be displayed on a flat display device. Along the way, vertices may be rotated, scaled, eliminated or clipped because they fall outside the viewable area, are lit by various lighting schemes, colorized, and so forth. Thus, the process of rendering and displaying a three dimensional object can be computationally intensive and may involve a large number of vertices.

A triangle has many helpful properties that make it ideal for use in rendering three dimensional surfaces. A triangle is completely defined by three vertices and a triangle also uniquely defines a plane. Thus, many systems will use a plurality of triangles to render a three dimensional surface. If each triangle is passed separately to the graphic subsystem that renders the three dimensional object, then three vertices for each triangle must be passed and processed by the graphic subsystem. However, the number of vertices that must be passed and processed by the graphic subsystem can be reduced through "vertex sharing." Vertex sharing relies on a property of shared sides among triangles. Although it takes three vertices to define one triangle, it only takes four vertices to define two triangles if they share a common side. In order to take advantage of vertex sharing to reduce the number of vertices needed to render an object, pipelined systems have been developed that divide a three dimensional object into triangle strips that can then be processed and displayed efficiently.

Indeed, specialized 3D software objects and/or hardware components such as procedural shaders have been created or designed for the purpose of carrying out specialized graphics functionality upon graphics data, in order to speed the process of rendering complex graphics objects. Procedural shaders, such as vertex and pixel shaders, have traditionally been used to perform such complex transformations on pixels and/or arrays of pixels or triangles.

However, the functionality of these procedural shading software objects or hardware components has been relatively fixed, leaving little flexibility at the developer end to perform efficient sets of operations that may be efficiently tailored to a particular graphics application or task.

Figure 6A:
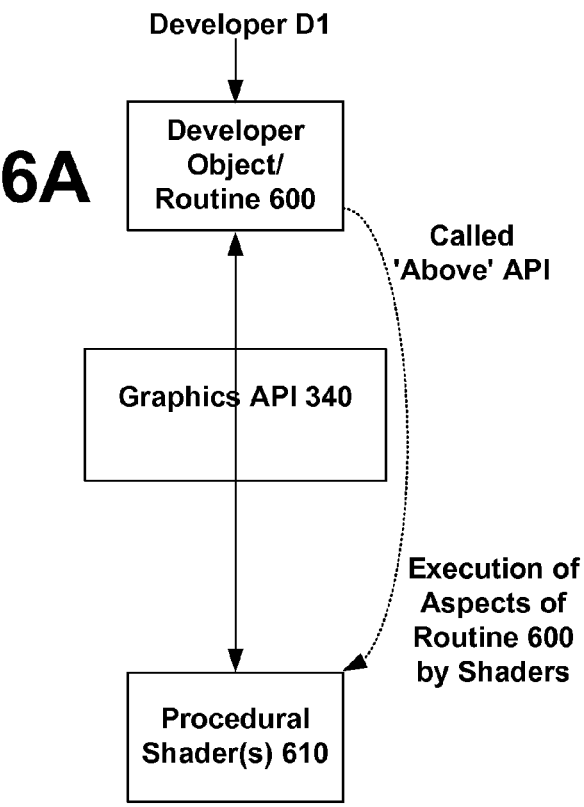
FIG. 6A illustrates prior art techniques of interacting with procedural shaders.

Thus, with previous 3D APIs, the API did not provide the developer with flexibility as to operations that could be performed in connection with procedural shaders, such as vertex and pixel shaders. Vertex and pixel shaders, which may be implemented with software or in hardware or with a combination of both, have specialized functionality. Currently, in order to utilize useful algorithmic elements of a procedural shader, or otherwise use fixed and limited functionality of the procedural shader, a developer has to invariably design software procedural shader algorithms from scratch for each application. While the core commands for use with the procedural shaders were available to the developer, the effective or efficient combination of these commands is left to the developer. Consequently, algorithms that are unique, common and useful in connection with typical 3D graphics processes, such as for typical use in connection with procedural shaders, are developed from the ground up for each application. Conceptually, these elements for acting on procedural shaders have been customized by necessity for each application and thus provided 'above' the API, programmed as part of the graphics application itself. As shown in FIG. 6A, developer D1, with access to a specification for a procedural shader 610, programs an inflexible object 600 so as to work with or control the procedural shader 610. As FIG. 6A illustrates, developer D1 develops a shading algorithm with code. After customization by the developer D1, object 600 interacts with shader(s) 610 via graphics API 340.

Figure 6B:
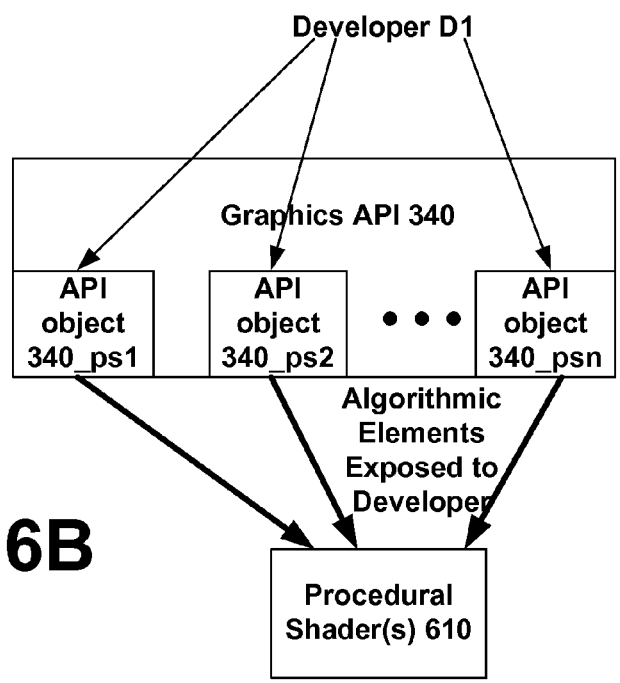
FIG. 6B illustrates techniques of communicating with procedural shaders in accordance with the 3D graphics API of the present invention.

With present hardware designs of procedural shaders, however, a specialized set of assembly language instructions has been developed creating flexibility of procedural shader use. The developer still has access to the specialized set of instructions as in the past. Advantageously, with the present invention, this specialized set of instructions, or list of tokens packed as an array of numbers, can be combined in such ways as to create useful algorithmic elements. The present invention takes these useful combinations and exposes the algorithmic elements to the developer by way of the API 340. Conceptually, therefore, the present invention provides these useful algorithmic elements for acting on procedural shaders below or inside the API. As FIG. 6B illustrates, the present invention provides API objects 340_ps1, 340_ps2, . . . 340_psn, which are useful combinations of procedural shader 610's instruction set for acting upon shader 610. In this fashion, algorithmic elements for use with procedural shader 610 are exposed to the developer D1.

For more concrete examples of algorithmic elements that used to be customized by necessity above the API, which are now provided for use below are any of the following types of techniques, taken alone or in combination: lighting, colorizing, mapping, texturizing, surfacing, shading, enhancing, and other image processing techniques.

Some exemplary code or definitional pseudocode for a procedural shader, such as a vertex shader, is provided below. The declaration portion of an exemplary procedural shader defines the static external interface of the procedural shader. The information in the declaration includes assignments of vertex shader input registers to data streams. These assignments bind a specific vertex register to a single component within a vertex stream. A vertex stream element is identified by a byte offset within the stream and a type. The type specifies the arithmetic data type plus the dimensionality (1, 2, 3, or 4 values). Stream data that is less than four values are preferably expanded out to four values with zero or more 0.F values and one 1.F value.

The information in the declaration also includes assignment of vertex shader input registers to implicit data from the primitive tessellator. This controls the loading of vertex data which is not loaded from a stream, but rather is generated during primitive tessellation prior to the vertex shader.

Moreover, the information in the declaration also includes loading data into the constant memory at the time a procedural shader is set as the current procedural shader. Each token specifies values for one or more contiguous 4 DWORD constant registers. This allows the procedural shader to update an arbitrary subset of the constant memory, overwriting the device state (which contains the current values of the constant memory). Note that these values can be subsequently overwritten (between DrawPrimitive calls) during the time a procedural shader is bound to a device via the SetVertexShaderConstant method.

Declaration arrays are single-dimensional arrays of DWORDs composed of multiple tokens each of which is one or more DWORDs. The single DWORD token value 0xFFFFFFFF is a special token used to indicate the end of the declaration array. The single DWORD token value 0x00000000 is a NOP token with is ignored during the declaration parsing. Note that 0x00000000 is a valid value for DWORDs following the first DWORD for multiple word tokens.

---

[31:29] TokenType

0x0 - NOP (requires all DWORD bits to be zero)
0x1 - stream selector
0x2 - stream data definition (map to vertex input memory)
0x3 - vertex input memory from tessellator
0x4 - constant memory from shader
0x5 - extension
0x6 - reserved
0x7 - end-of-array (requires all DWORD bits to be 1)
NOP Token (single DWORD token)

[31:29] 0x0
[28:00] 0x0
Stream Selector (single DWORD token)

[31:29] 0x1
[28] indicates whether this is a tessellator stream
[27:04] 0x0
[03:00] stream selector (0..15)
Stream Data Definition (single DWORD token)

---

Vertex Input Register Load

[31:29] 0x2
[28] 0x0
[27:20] 0x0
[19:16] type (dimensionality and data type)
[15:04] 0x0
[03:00] vertex register address (0..15)
Data Skip (no register load)

[31:29] 0x2
[28] 0x1
[27:20] 0x0
[19:16] count of DWORDS to skip over (0..15)
[15:00] 0x0
Vertex Input Memory from Tessellator Data (single DWORD token)

[31:29] 0x3
[28] indicates whether data is normals or u/v
[27:24] 0x0
[23:20] vertex register address (0..15)
[19:16] type (dimensionality)
[15:04] 0x0
[03:00] vertex register address (0..15)
Constant Memory from Shader (multiple DWORD token)

[31:29] 0x4
[28:25] count of 4*DWORD constants to load (0..15)
[24:07] 0x0
[06:00] constant memory address (0..95)
Extension Token (single or multiple DWORD token)

[31:29] 0x5
[28:24] count of additional DWORDs in token (0..31)
[23:00] extension-specific information
End-of-array token (single DWORD token)

[31:29] 0x7
[28:00] 0x1fffffff

---

The stream selector token is desirably followed by a contiguous set of stream data definition tokens. This token sequence fully defines that stream, including the set of elements within the stream, the order in which the elements appear, the type of each element, and the vertex register into which to load an element.

Streams are allowed to include data which is not loaded into a vertex register, thus allowing data which is not used for this shader to exist in the vertex stream. This skipped data is defined only by a count of DWORDs to skip over, since the type information is irrelevant.

---

The token sequence:

Stream Select: stream=0
Stream Data Definition (Load): type=FLOAT3; register=3
Stream Data Definition (Load): type=FLOAT3; register=4
Stream Data Definition (Skip): count=2
Stream Data Definition (Load): type=FLOAT2; register=7

--- defines stream zero to consist of four elements, three of which are loaded into registers and the fourth skipped over. Register 3 is loaded with the first three DWORDs in each vertex interpreted as FLOAT data. Register 4 is loaded with the fourth, fifth, and sixth DWORDs interpreted as FLOAT data. The next two DWORDs (seventh and eighth) are skipped over and not loaded into any vertex input register. Register 7 is loaded with the ninth and tenth DWORDS interpreted as FLOAT data.

Placing of tokens other than NOPs between the Stream Selector and Stream Data Definition tokens is disallowed.

```
typedef enum_D3DVSD_TOKENTYPE
{
    D3DVSD_TOKEN_NOP      = 0,   // NOP or extension
    D3DVSD_TOKEN_STREAM,         // stream selector
    D3DVSD_TOKEN_STREAMDATA,     // stream data definition (map to vertex input
memory)
    D3DVSD_TOKEN_TESSELLATOR,    // vertex input memory from tessellator
    D3DVSD_TOKEN_CONSTMEM,       // constant memory from shader
    D3DVSD_TOKEN_EXT,            // extension
    D3DVSD_TOKEN_END = 7,        // end-of-array (requires all DWORD bits to be 1)
    D3DVSD_FORCE_DWORD = 0x7fffffff,// force 32-bit size enum
} D3DVSD_TOKENTYPE;
#define D3DVSD_TOKENTYPESHIFT   29
#define D3DVSD_TOKENTYPEMASK    (7 << D3DVSD_TOKENTYPESHIFT)
#define D3DVSD_STREAMNUMBERSHIFT 0
#define D3DVSD_STREAMNUMBERMASK (0xF << D3DVSD_STREAMNUMBERSHIFT)
#define D3DVSD_DATALOADTYPESHIFT 28
#define D3DVSD_DATALOADTYPEMASK (0x1 << D3DVSD_DATALOADTYPESHIFT)
#define D3DVSD_DATATYPESHIFT 16
#define D3DVSD_DATATYPEMASK (0xF << D3DVSD_DATATYPESHIFT)
#define D3DVSD_SKIPCOUNTSHIFT 16
#define D3DVSD_SKIPCOUNTMASK (0xF << D3DVSD_SKIPCOUNTSHIFT)
#define D3DVSD_VERTEXREGSHIFT 0
#define D3DVSD_VERTEXREGMASK (0x1F << D3DVSD_VERTEXREGSHIFT)
#define D3DVSD_VERTEXREGINSHIFT 20
#define D3DVSD_VERTEXREGINMASK (0xF << D3DVSD_VERTEXREGINSHIFT)
#define D3DVSD_CONSTCOUNTSHIFT 25
#define D3DVSD_CONSTCOUNTMASK (0xF << D3DVSD_CONSTCOUNTSHIFT)
#define D3DVSD_CONSTADDRESSSHIFT 0
#define D3DVSD_CONSTADDRESSMASK (0x7F << D3DVSD_CONSTADDRESSSHIFT)
#define D3DVSD_CONSTRSSHIFT 16
#define D3DVSD_CONSTRSMASK (0x1FFF << D3DVSD_CONSTRSSHIFT)
#define D3DVSD_EXTCOUNTSHIFT 24
#define D3DVSD_EXTCOUNTMASK (0x1F << D3DVSD_EXTCOUNTSHIFT)
#define D3DVSD_EXTINFOSHIFT 0
#define D3DVSD_EXTINFOMASK (0xFFFFFF << D3DVSD_EXTINFOSHIFT)
#define D3DVSD_MAKETOKENTYPE(tokenType) ((tokenType <<
D3DVSD_TOKENTYPESHIFT) & D3DVSD_TOKENTYPEMASK)
// macros for generation of CreateVertexShader Declaration token array
// Set current stream
// _StreamNumber [0..(MaxStreams-1)] stream to get data from
//
#define D3DVSD_STREAM( _StreamNumber ) \
    (D3DVSD_MAKETOKENTYPE(D3DVSD_TOKEN_STREAM) | (_StreamNumber))
// Set tessellator stream
//
#define D3DVSD_STREAMTESSSHIFT 28
#define D3DVSD_STREAMTESSMASK (1 << D3DVSD_STREAMTESSSHIFT)
#define D3DVSD_STREAM_TESS( ) \
    (D3DVSD_MAKETOKENTYPE(D3DVSD_TOKEN_STREAM) |
(D3DVSD_STREAMTESSMASK))
// bind single vertex register to vertex element from vertex stream
//
// _VertexRegister [0..15] address of the vertex register
// _Type [D3DVSDT_*] dimensionality and arithmetic data type
#define D3DVSD_REG( _VertexRegister, _Type ) \
    (D3DVSD_MAKETOKENTYPE(D3DVSD_TOKEN_STREAMDATA) |     \
    ((_Type) << D3DVSD_DATATYPESHIFT) | (_VertexRegister))
// Skip _DWORDCount DWORDs in vertex
//
#define D3DVSD_SKIP( _DWORDCount ) \
    (D3DVSD_MAKETOKENTYPE(D3DVSD_TOKEN_STREAMDATA) | 0x10000000 | \
    ((_DWORDCount) << D3DVSD_SKIPCOUNTSHIFT))
// load data into vertex shader constant memory
//
// _ConstantAddress [0..95] - address of constant array to begin filling
data
// _Count [0.. 15] - number of constant vectors to load (4 DWORDs each)
// followed by 4*_Count DWORDS of data
//
#define D3DVSD_CONST( _ConstantAddress, _Count ) \
    (D3DVSD_MAKETOKENTYPE(D3DVSD_TOKEN_CONSTMEM) | \
    ((_Count) << D3DVSD_CONSTCOUNTSHIFT) | (_ConstantAddress))
// enable tessellator generated normals
//
// _VertexRegisterIn [0..15] address of vertex register whose input
stream
//                   will be used in normal computation
// _VertexRegisterOut [0..15] address of vertex register to output the
normal to
```

```
//
#define D3DVSD_TESSNORMAL( _VertexRegisterIn, _VertexRegisterOut ) \
    (D3DVSD_MAKETOKENTYPE(D3DVSD_TOKEN_TESSELLATOR) | \
    ((_VertexRegisterIn) << D3DVSD_VERTEXREGINSHIFT) | \
    ((0x02) << D3DVSD_DATATYPESHIFT) | (_VertexRegisterOut))
// enable tessellator generated surface parameters
//
// _VertexRegister [0..15] address of vertex register to output parameters
//
#define D3DVSD_TESSUV( _VertexRegister ) \
    (D3DVSD_MAKETOKENTYPE(D3DVSD_TOKEN_TESSELLATOR) | 0x10000000 | \
    ((0x01) << D3DVSD_DATATYPESHIFT) | (_VertexRegister))
// Generates END token
//
#define D3DVSD_END( ) 0xFFFFFFFF
// Generates NOP token
#define D3DVSD_NOP( ) 0x00000000
// bit declarations for _Type fields
#define D3DVSDT_FLOAT1    0x00    // 1D float expanded to (value, 0.,
0., 1.)
#define D3DVSDT_FLOAT2    0x01    // 2D float expanded to (value, value,
0., 1.)
#define D3DVSDT_FLOAT3    0x02    // 3D float expanded to (value, value,
value, 1.)
#define D3DVSDT_FLOAT4    0x03    // 4D float
#define D3DVSDT_D3DCOLOR  0x04    // 4D packed unsigned bytes mapped to
0. to 1. range
                // Input is in D3DCOLOR format (ARGB)
expanded to (R, G, B, A)
#define D3DVSDT_UBYTE4    0x05    // 4D unsigned byte
#define D3DVSDT_SHORT2    0x06    // 2D signed short expanded to (value,
value, 0., 1.)
#define D3DVSDT_SHORT4    0x07    // 4D signed short
// assignments of vertex input registers for fixed function vertex shader
//
#define D3DVSDE_POSITION       0
#define D3DVSDE_BLENDWEIGHT    1
#define D3DVSDE_BLENDINDICES   2
#define D3DVSDE_NORMAL         3
#define D3DVSDE_PSIZE          4
#define D3DVSDE_DIFFUSE        5
#define D3DVSDE_SPECULAR       6
#define D3DVSDE_TEXCOORD0      7
#define D3DVSDE TEXCOORD1      8
#define D3DVSDE_TEXCOORD2      9
#define D3DVSDE_TEXCOORD3      10
#define D3DVSDE_TEXCOORD4      11
#define D3DVSDE_TEXCOORD5      12
#define D3DVSDE_TEXCOORD6      13
#define D3DVSDE_TEXCOORD7      14
#define D3DVSDE_POSITION2      15
#define D3DVSDE_NORMAL2        16
// Maximum supported number of texture coordinate sets
#define D3DDP_MAXTEXCOORD 8
;begin_internal
//-------------------------------------------------------------------
//
// Pixel Shader (PS) & Vertex Shader (VS) Instruction Token Definition
//
// **** Version Token ****
// [07:00] minor version number
// [15:08] major version number
// [31:16]
//    PS 0xFFFF
//    VS 0xFFFE
//
// **** End Token ****
// [31:00] 0x0000FFFF
//
// **** Comment Token ****
// [15:00] 0xFFFE
// [30:16] DWORD Length (up to 2 15 DWORDS = 128KB)
// [31] 0x0
//
// **** Instruction Token ****
// [15:00] Opcode (D3DSIO_*)
// [23:16] Opcode-Specific Controls
// [29:24] Reserved 0x0
// [30] Co-Issue - if set then execute this instruction with the previous
instruction(s)
```

```
// [31] 0x0
//
// **** Destination Parameter Token ****
// [07:00] Register Number (offset in register file)
// [15:08] Reserved 0x0
// [19:16] Write Mask
//     [16] Component 0 (X;Red)
//     [17] Component 1 (Y;Green)
//     [18] Component 2 (Z;Blue)
//     [19] Component 3 (W;Alpha)
// [23:20]
//     PS Result Modifier
//     VS Reserved 0x0
// [27:24]
//     PS Result Shift Scale (signed shift)
//     VS Reserved 0x0
// [30:28] Register Type
//     [0x0] Temporary Register File
//     [0x1] Reserved
//     [0x2] Reserved
//     [0x3]
//         VS Address Register (reg num must be zero)
//         PS Reserved
//     [0x4]
//         VS Rasterizer Output Register File
//         PS Reserved
//     [0x5]
//         VS Attribute Output Register File
//         PS Reserved
//     [0x6]
//         VS Texture Coordinate Register File
//         PS Reserved
//     [0x7] Reserved
// [31] 0x1
//
// **** Source Parameter Token *****
// [12:00] Register Number (offset in register file)
// [13]
// VS Relative Address
// PS Reserved 0x0
// [14:15]
//     VS Relative Address Register Component
//     PS Reserved 0x0
// [23:16] Source Component Swizzle
//     [17:16] Component 0 Swizzle
//     [19:18] Component 1 Swizzle
//     [21:20] Component 2 Swizzle
//     [23:22] Component 3 Swizzle
// [27:24] Source Modifier
//     [0x0] None
//     [0x1] Negate
//     [0x2] Bias
//     [0x3] Bias and Negate
//     [0x4] Sign
//     [0x5] Sign and Negate
//     [0x6] Complement
//     [0x7-0xf] Reserved
// [30:28] Register Type
//     [0x0] Temporary Register File
//     [0x1] Input Register File
//     [0x2] Constant Register File
//     [0x3-0x7] Reserved
// [31] 0x1
//
// The exception for source parameter tokens is with the instruction:
// D3DSIO_DEF c#,f0,f1,f2,f2
// Here, the source parameter tokens (f#) are each taken as 32 bit floats.
//
;end_internal
//
// Instruction Token Bit Definitions
//
#define D3DSI_OPCODE_MASK 0x0000FFFF
typedef enum_D3DSHADER_INSTRUCTION_OPCODE_TYPE
{
  D3DSIO_NOP    = 0,   // PS/VS
  D3DSIO_MOV    ,      // PS/VS
  D3DSIO_ADD    ,      // PS/VS
  D3DSIO_SUB    ,      // PS
  D3DSIO_MAD    ,      // PS/VS
```

-continued

```
    D3DSIO_MUL      ,       // PS/VS
    D3DSIO_RCP      ,       // VS
    D3DSIO_RSQ      ,       // VS
    D3DSIO_DP3      ,       // PS/VS
    D3DSIO_DP4      ,       // PS/VS
    D3DSIO_MIN      ,       // VS
    D3DSIO_MAX      ,       // VS
    D3DSIO_SLT      ,       // VS
    D3DSIO_SGE      ,       // VS
    D3DSIO_EXP      ,       // VS
    D3DSIO_LOG      ,       // VS
    D3DSIO_LIT      ,       // VS
    D3DSIO_DST      ,       // VS
    D3DSIO_LRP      ,       // PS
    D3DSIO_FRC      ,       // VS
    D3DSIO_M4x4     ,       // VS
    D3DSIO_M4x3     ,       // VS
    D3DSIO_M3x4     ,       // VS
    D3DSIO_M3x3     ,       // VS
    D3DSIO_M3x2     ,       // VS
    D3DSIO_TEXCOORD    = 64,   // PS
    D3DSIO_TEXKILL    ,       // PS
    D3DSIO_TEX      ,       // PS
    D3DSIO_TEXBEM     ,       // PS
    D3DSIO_TEXBEML    ,       // PS
    D3DSIO_TEXREG2AR  ,       // PS
    D3DSIO_TEXREG2GB  ,       // PS
    D3DSIO_TEXM3x2PAD ,       // PS
    D3DSIO_TEXM3x2TEX ,       // PS
    D3DSIO_TEXM3x3PAD ,       // PS
    D3DSIO_TEXM3x3TEX ,       // PS
    D3DSIO_TEXM3x3DIFF ,      // PS
    D3DSIO_TEXM3x3SPEC ,      // PS
    D3DSIO_TEXM3x3VSPEC, // PS
    D3DSIO_EXPP     ,       // VS
    D3DSIO_LOGP     ,       // VS
    D3DSIO_CND      ,       // PS
    D3DSIO_DEF      ,       // PS
;begin_internal
    D3DSIO_RESERVED0    = 96,   // PS
    D3DSIO_RESERVED1 ,       // PS
    D3DSIO_RESERVED2 ,       // PS
    D3DSIO_RESERVED3 ,       // PS
;end_internal
    D3DSIO_COMMENT    = 0xFFFE,
    D3DSIO_END      = 0xFFFF,
    D3DSIO_FORCE_DWORD = 0x7fffffff,    // force 32-bit size enum
} D3DSHADER_INSTRUCTION_OPCODE_TYPE;
//
// Co-Issue Instruction Modifier - if set then this instruction is to be
// issued in parallel with the previous instruction(s) for which this bit
// is not set.
//
#define D3DSI_COISSUE       0x40000000
//
// Parameter Token Bit Definitions
//
#define D3DSP_REGNUM_MASK       0x00000FFF
// destination parameter write mask
#define D3DSP_WRITEMASK_0    0x00010000 // Component 0 (X;Red)
#define D3DSP_WRITEMASK_1    0x00020000 // Component 1 (Y;Green)
#define D3DSP_WRITEMASK_2    0x00040000 // Component 2 (Z;Blue)
#define D3DSP_WRITEMASK_3    0x00080000 // Component 3 (W;Alpha)
#define D3DSP_WRITEMASK_ALL   0x000F0000 // All Components
// destination parameter modifiers
#define D3DSP_DSTMOD_SHIFT    20
#define D3DSP_DSTMOD_MASK     0x00F00000
typedef enum _D3DSHADER_PARAM_DSTMOD_TYPE
{
    D3DSPDM_NONE   = 0<<D3DSP_DSTMOD_SHIFT, // nop
    D3DSPDM_SATURATE= 1<<D3DSP_DSTMOD_SHIFT, // clamp to 0. to 1. range
    D3DSPDM_FORCE_DWORD = 0x7fffffff,      // force 32-bit size enum
} D3DSHADER_PARAM_DSTMOD_TYPE;
// destination parameter shift
#define D3DSP_DSTSHIFT_SHIFT 24
#define D3DSP_DSTSHIFT_MASK 0x0F000000
// destination/source parameter register type
#define D3DSP_REGTYPE_SHIFT 28
#define D3DSP_REGTYPE_MASK 0x70000000
typedef enum _D3DSHADER_PARAM_REGISTER_TYPE
```

```
{
    D3DSPR_TEMP    = 0<<D3DSP_REGTYPE_SHIFT, // Temporary Register File
    D3DSPR_INPUT   = 1<<D3DSP_REGTYPE_SHIFT, // Input Register File
    D3DSPR_CONST   = 2<<D3DSP_REGTYPE_SHIFT, // Constant Register File
    D3DSPR_ADDR    = 3<<D3DSP_REGTYPE_SHIFT, // Address Register (VS)
    D3DSPR_TEXTURE = 3<<D3DSP_REGTYPE_SHIFT, // Texture Register File
(PS)
    D3DSPR_RASTOUT = 4<<D3DSP_REGTYPE_SHIFT, // Rasterizer Register File
    D3DSPR_ATTROUT = 5<<D3DSP_REGTYPE_SHIFT, // Attribute Output Register
File
    D3DSPR_TEXCRDOUT= 6<<D3DSP_REGTYPE_SHIFT, // Texture Coordinate Output
Register File
    D3DSPR_FORCE_DWORD = 0x7fffffff,    // force 32-bit size enum
} D3DSHADER_PARAM_REGISTER_TYPE;
// Register offsets in the Rasterizer Register File
//
typedef enum _D3DVS_RASTOUT_OFFSETS
{
    D3DSRO_POSITION = 0,
    D3DSRO_FOG,
    D3DSRO_POINT_SIZE,
    D3DSRO_FORCE_DWORD = 0x7fffffff,    // force 32-bit size enum
} D3DVS_RASTOUT_OFFSETS;
// Source operand addressing modes
#define D3DVS_ADDRESSMODE_SHIFT 13
#define D3DVS_ADDRESSMODE_MASK (1 << D3DVS_ADDRESSMODE_SHIFT)
typedef enum _D3DVS_ADDRESSMODE_TYPE
{
    D3DVS_ADDRMODE_ABSOLUTE = (0 << D3DVS_ADDRESSMODE_SHIFT),
    D3DVS_ADDRMODE_RELATIVE = (1 << D3DVS_ADDRESSMODE_SHIFT),    //
Relative to register A0
    D3DVS_ADDRMODE_FORCE_DWORD = 0x7fffffff, // force 32-bit size enum
} D3DVS_ADDRESSMODE_TYPE;
// Source operand swizzle definitions
//
#define D3DVS_SWIZZLE_SHIFT      16
#define D3DVS_SWIZZLE_MASK       0x00FF0000
// The following bits define where to take component X:
#define D3DVS_X_X      (0 << D3DVS_SWIZZLE_SHIFT)
#define D3DVS_X_Y      (1 << D3DVS_SWIZZLE_SHIFT)
#define D3DVS_X_Z      (2 << D3DVS_SWIZZLE_SHIFT)
#define D3DVS_X_W      (3 << D3DVS_SWIZZLE_SHIFT)
// The following bits define where to take component Y:
#define D3DVS_Y_X      (0 << (D3DVS_SWIZZLE_SHIFT + 2))
#define D3DVS_Y_Y      (1 << (D3DVS_SWIZZLE_SHIFT + 2))
#define D3DVS_Y_Z      (2 << (D3DVS_SWIZZLE_SHIFT + 2))
#define D3DVS_Y_W      (3 << (D3DVS_SWIZZLE_SHIFT + 2))
// The following bits define where to take component Z:
#define D3DVS_Z_X      (0 << (D3DVS_SWIZZLE_SHIFT + 4))
#define D3DVS_Z_Y      (1 << (D3DVS_SWIZZLE_SHIFT + 4))
#define D3DVS_Z_Z      (2 << (D3DVS_SWIZZLE_SHIFT + 4))
#define D3DVS_Z_W      (3 << (D3DVS_SWIZZLE_SHIFT + 4))
// The following bits define where to take component W:
#define D3DVS_W_X      (0 << (D3DVS_SWIZZLE_SHIFT + 6))
#define D3DVS_W_Y      (1 << (D3DVS_SWIZZLE_SHIFT + 6))
#define D3DVS_W_Z      (2 << (D3DVS_SWIZZLE_SHIFT + 6))
#define D3DVS_W_W      (3 << (D3DVS_SWIZZLE_SHIFT + 6))
// Value when there is no swizzle (X is taken from X, Y is taken from Y,
// Z is taken from Z, W is taken from W
//
#define D3DVS_NOSWIZZLE (D3DVS_X_X | D3DVS_Y_Y | D3DVS_Z_Z | D3DVS_W_W)
// source parameter swizzle
#define D3DSP SWIZZLE SHIFT    16
#define D3DSP_SWIZZLE_MASK   0x00FF0000
#define D3DSP_NOSWIZZLE \
    ( (0 << (D3DSP_SWIZZLE_SHIFT + 0)) | \
      (1 << (D3DSP_SWIZZLE_SHIFT + 2)) | \
      (2 << (D3DSP_SWIZZLE_SHIFT + 4)) | \
      (3 << (D3DSP_SWIZZLE_SHIFT + 6)) )
// pixel-shader swizzle ops
#define D3DSP_REPLICATEALPHA \
    ( (3 << (D3DSP_SWIZZLE_SHIFT + 0)) | \
      (3 << (D3DSP_SWIZZLE_SHIFT + 2)) | \
      (3 << (D3DSP_SWIZZLE_SHIFT + 4)) | \
      (3 << (D3DSP_SWIZZLE_SHIFT + 6)) )
// source parameter modifiers
#define D3DSP_SRCMOD_SHIFT     24
#define D3DSP_SRCMOD_MASK      0x0F000000
typedef enum_D3DSHADER_PARAM_SRCMOD_TYPE
{
```

```
    D3DSPSM_NONE    = 0<<D3DSP_SRCMOD_SHIFT, // nop
    D3DSPSM_NEG     = 1<<D3DSP_SRCMOD_SHIFT, // negate
    D3DSPSM_BIAS    = 2<<D3DSP_SRCMOD_SHIFT, // bias
    D3DSPSM_BIASNEG = 3<<D3DSP_SRCMOD_SHIFT, // bias and negate
    D3DSPSM_SIGN    = 4<<D3DSP_SRCMOD_SHIFT, // sign
    D3DSPSM_SIGNNEG = 5<<D3DSP_SRCMOD_SHIFT, // sign and negate
    D3DSPSM_COMP    = 6<<D3DSP_SRCMOD_SHIFT, // complement
    D3DSPSM_FORCE_DWORD = 0x7fffffff,        // force 32-bit size enum
} D3DSHADER_PARAM_SRCMOD_TYPE;
// pixel shader version token
#define D3DPS_VERSION(_Major,_Minor) (0xFFFF0000|((_Major)<<8)|(_Minor))
// vertex shader version token
#define D3DVS_VERSION(_Major,_Minor) (0xFFFE0000|((_Major)<<8)|(_Minor))
// extract major/minor from version cap
#define D3DSHADER_VERSION_MAJOR(_Version) (((_Version)8)&0xFF)
#define D3DSHADER_VERSION_MINOR(_Version) (((_Version)0)&0xFF)
// destination/source parameter register type
#define D3DSI_COMMENTSIZE_SHIFT    16
#define D3DSI_COMMENTSIZE_MASK     0x7FFF0000
#define D3DSHADER_COMMENT(_DWordSize) \
((((_DWordSize)<<D3DSI_COMMENISIZE_SHIFT)&D3DSI_COMMENTSIZE_MASK)|D3DSIO
_COMMENT)
// pixel/vertex shader end token
#define D3DPS_END( ) 0x0000FFFF
#define D3DVS_END( ) 0x0000FFFF
```

While the above exemplary computer-executable instructions have been described in the context of a procedural shader, these concepts and principles may be applied to any 3D hardware rendering device utilized in connection with a graphics display system.

Improvements on the Display (Rasterizer) Side of the API

Figure 7A:
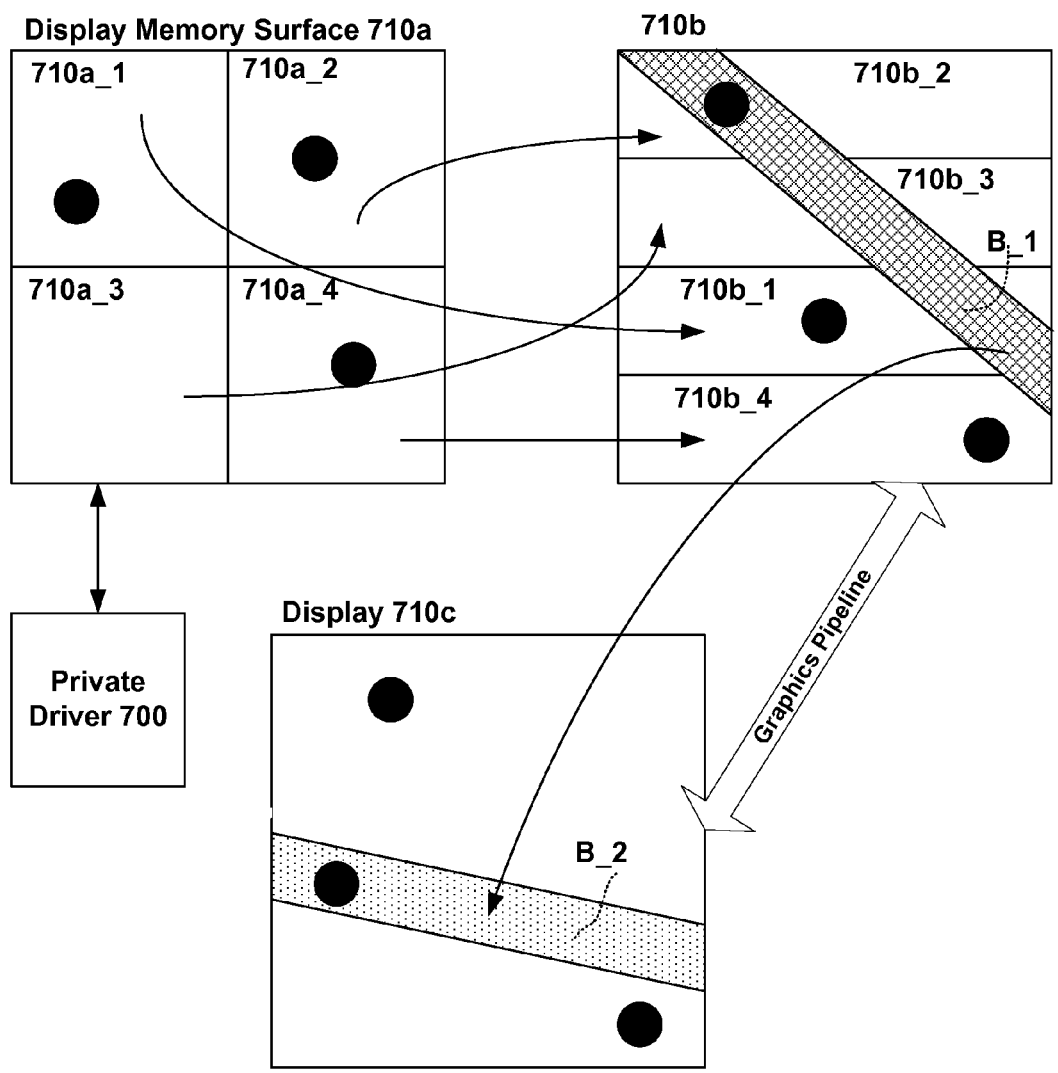
FIG. 7A illustrates a private driving format in connection with which the 3D graphics API of the present invention may be implemented.

As mentioned above, while direct video memory access was once a possibility, it is no longer a possibility according to today's currently utilized graphics architectures. In accordance with today's graphics pipeline architecture, specialized or private drivers and surface formats are used in connection with very fast graphics accelerators. With direct rasterizer/processor access to display memory surfaces, "chunks" of surfaces can be moved around according to the specialized surface format, and pulled for processing as efficiency dictates. Thus, the pipeline between display memory surface space and the display itself has been made more efficient. With reference to FIG. 7A, an example of the type of modern 'chunk' manipulation is illustrated at a microcosmic level i.e., only 4 squares or chunks of data are illustrated. Private driver 700 causes chunks 710a_1 through 710a_4 to be grabbed as efficiency dictates and are subsequently manipulated with a rasterizer into an intermediate form 710b, wherein the original image may be unrecognizable. Then, data is moved along the graphics pipeline to render the final image on display 710c, whereby band B_1 of data may translate to band B_2 in the displayed image. These mathematical transformations, and timing thereof, have advanced algorithms for determining the efficiency of chunk grabbing and placement. In essence, many images involve redundant data, or data that can be exploited based upon temporal and spatial knowledge, and these algorithms exploit such knowledge to create an extremely efficient and fast graphics data rendering pipeline.

Figure 7B:
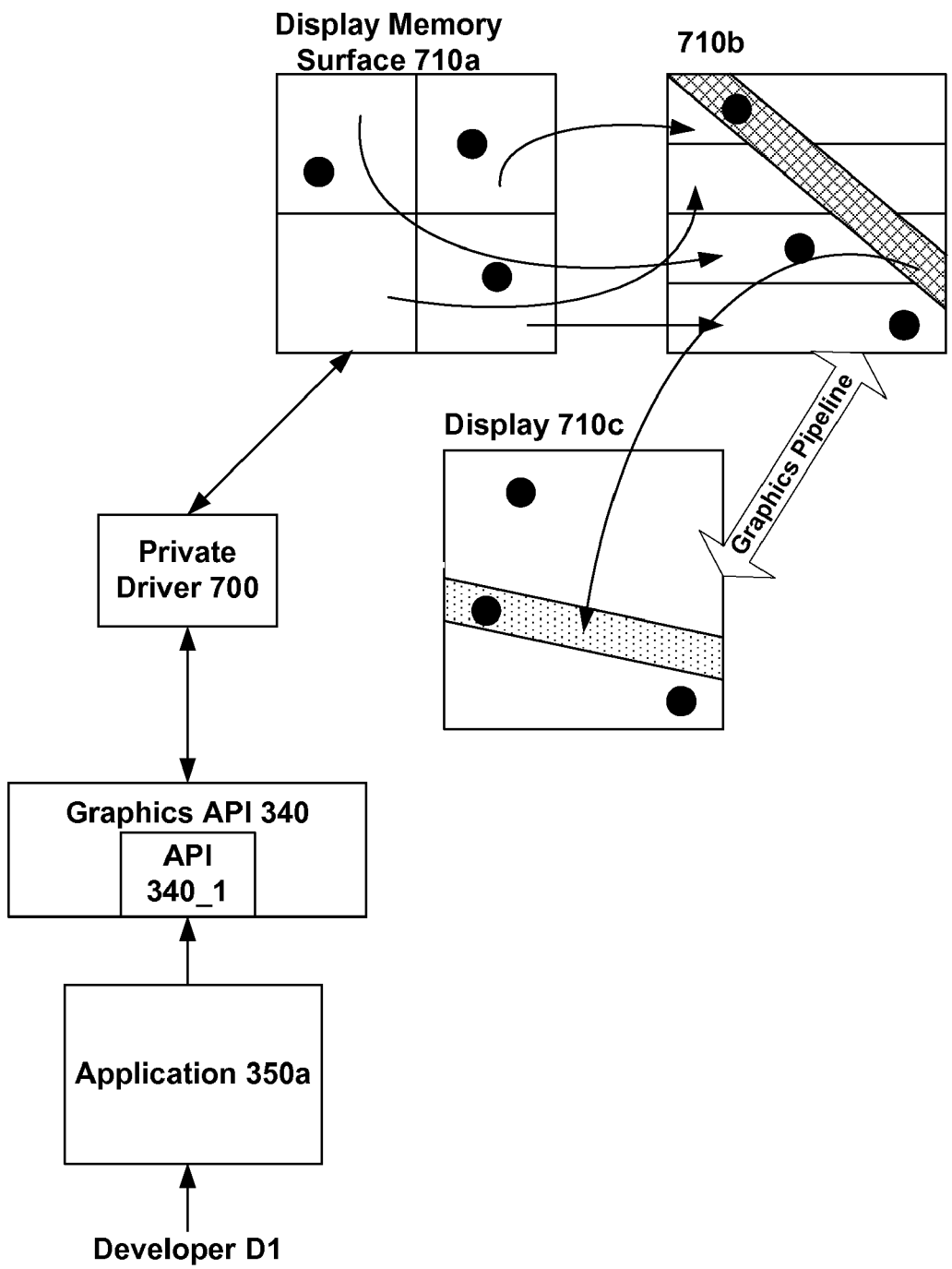
FIG. 7B illustrates the 3D graphics API of the present invention that operates seamlessly with respect to the private driving format of FIG. 7A.

Without the API of the present invention, however, display memory surface space must be set up properly by the developer to work with this privatized format. FIG. 7B illustrates API 340 in accordance with the present invention. The API object 340_1 of the present invention hides the efficiencies gained from the privatized driver format and rasterizer operation as described above from applications and developers. As far as the developer D1 writing application 350a is concerned, the display memory surface 710a receives a rectangular image that is then rendered upon the display 710c, when in fact many efficient operations and data manipulations take place behind the scenes. The present invention thus implements API object 340_1 such that it exposes more of these efficient pipeline operations to the developer D1 so that developer D1 need be less concerned with the performance of hidden operations, such as locking and unlocking the privatized formats pursuant to various commands and function calls over which the developer has no control.

Currently, when data is stored in hardware memory, the data is implemented in the privatized format illustrated in FIG. 7A. When graphics data is stored in main memory, it is stored in the public, more easily understood format. The privatized driver performs this transition. However, previously when graphics data stored in the hardware memory was asked for pursuant to some command or function call, the data was shuffled back to the public format, and then transmitted according to the private format for hardware purposes. Thus, upon an 'unlock' command, the data was copied to system memory in the public format, and then the data was transformed to the privatized format where necessary. Unfortunately, a problem arises wherein the same data may be 'unlocked' from hardware memory according to multiple function calls or commands, and consequently, multiple copies of the same data may be copied to the system memory. The present invention addresses this problem by only allowing data to be copied into system memory space when the developer specifically makes such a request, and thus ensuring that only copies that the developer knows about are resident in the system. Reductions in performance as a result of multiple copies resident in main memory, when unnecessary, are thus avoided. In recognition that the data does not always need to be accessed from system memory space, the present invention thus allows the developer more freedom to command when data is copied to system memory when stored in the privatized format associated with hardware memory.

Optimal Switching of Data Objects Among Memory Locations

As described in the background, there are generally two types of containers or data structures that the API presents to a developer for use: one for pixels and one for polygons. Essentially, through passing arguments to the API (placing data into the containers), the developers can manipulate various graphics data structures. Once these containers are filled with data, there are various places, such as system memory or on a 3D card or chip, where this data may stored for further manipulation. The decision as to where to place this data is generally a performance issue. For instance, data for which fast access is not necessary can be stored in system memory, whereas data for which speed of access is the most important may be stored on a chip designed for ultra fast access. It is also sometimes the case that it is desirable to switch data or chunks of data from one memory location to another memory location at different stages of processing.

Figure 8A:
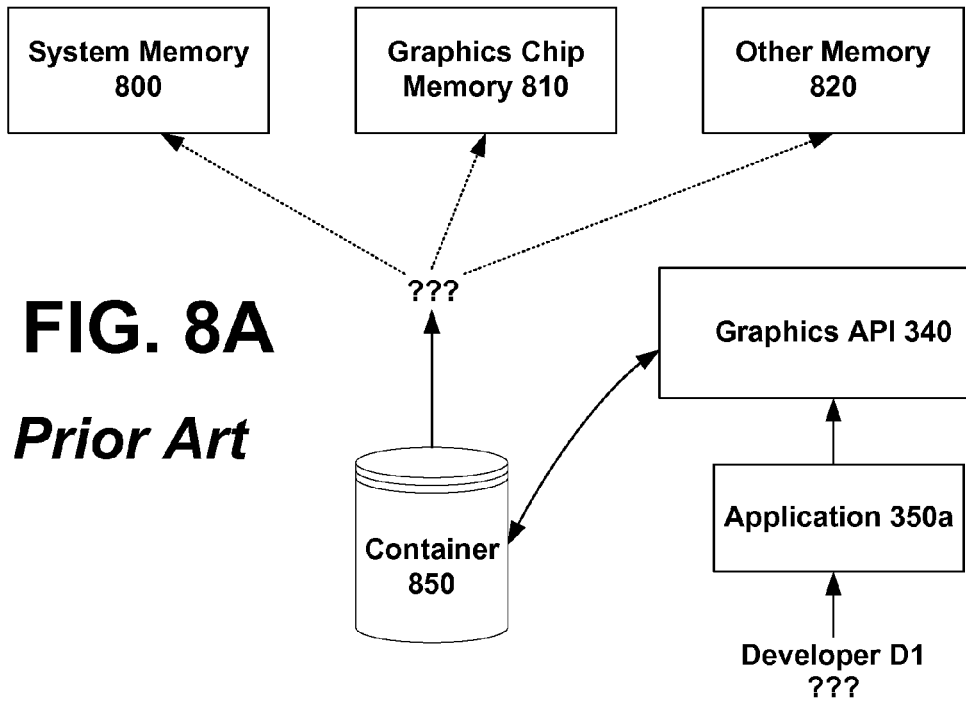
FIG. 8A illustrates a prior art technique of switching data among memory types with previous graphics APIs.

As illustrated in FIG. 8A, in the past, when a developer switched data from one memory location to another, the developer had to code the switching the data i.e., by destroying the data in the old location and recreating the data in the new location. Developer D1, after creating a data container 850 or deleting and recreating a data container 850 via graphics API 340, has the decision to make regarding where to place the new data container 850. While a developer may choose into which of system memory 800, graphics chip memory 810 and other memory 820 data container 850 is placed, oftentimes, a developer D1 may write a custom cache managing algorithm for application 350a in an effort to efficiently manage resources. In theory, the cache managing algorithm would try to account for all of the system parameters and attempt to manage memory based upon data location, frequency of accessing or processing the data, and processing times associated with certain locations. However, this is a great inconvenience to developer D1 who has to custom build each cache managing algorithm for each new application 350a, and who through oversight may not manage resources as efficiently as possible.

Figure 8B:
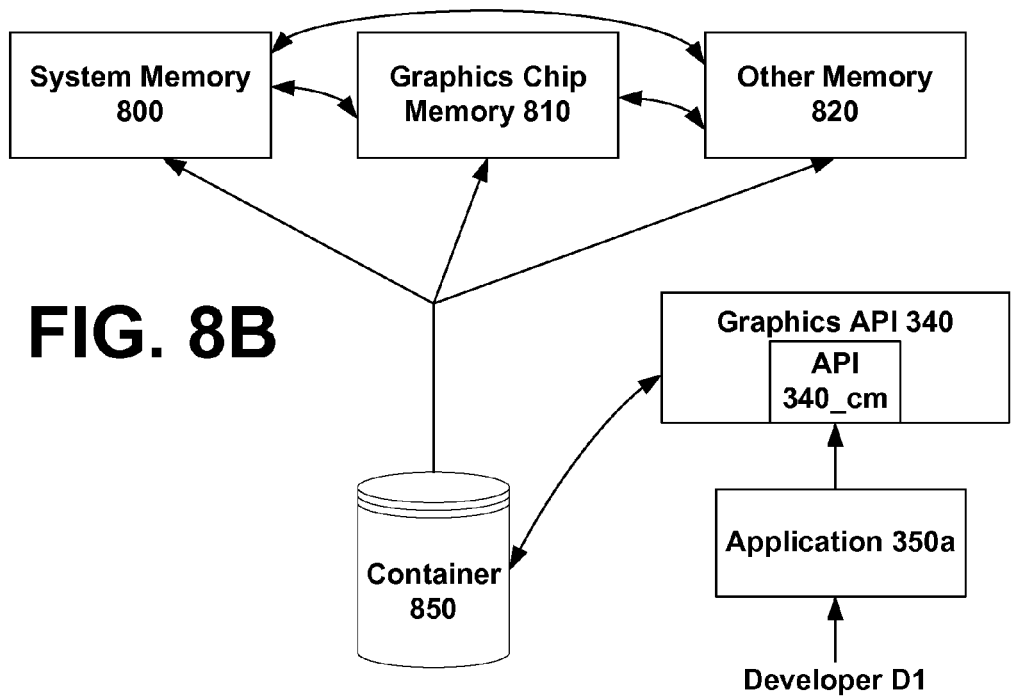
FIG. 8B illustrates the automatic switching of data among memory types in a graphics system in accordance with a cache managing algorithm of the 3D graphics API of the present invention.

As shown in FIG. 8B, in accordance with the present invention, the switching of data containers 850 from one location to another is performed automatically by an API object 340_cm. Thus, polygon or pixel data objects 850 are automatically transitioned between memory types such that the switching is seamless. It appears as if the data chunks/containers 850 last forever to the developer, whereas in reality, the API hides the fact that the data is being transitioned to optimize system performance. For example, it would in theory be desirable to keep all data on the faster hardware chip memory to process data. However, in reality, there is little room for such on chip data, sometimes as few as a hundred registers. Thus, typically a cache managing algorithm optimizes the tradeoff between host system memory and video memory on the 3D card so as to keep a maximum amount of data for processing in graphics hardware memory without causing overflow. As alluded to above, currently, a developer has to write such a cache managing algorithm for every application that is individually tailored to the programming task at hand. The API 340 of the present invention hides an optimal cache managing algorithm from developer D1 so that developer D1 need not be concerned with the optimal tradeoff of system resources, and so that efficient switching of data can take place 'behind the scenes' simplifying the developer's task. Data containers 850 are thus efficiently placed in storage to maximize data processing rates, and storage space, whether a data container 850 is newly created, or switched from one location to another.

Parallel Feeding of Data Objects to 3D Chip for Processing

Figure 9A:
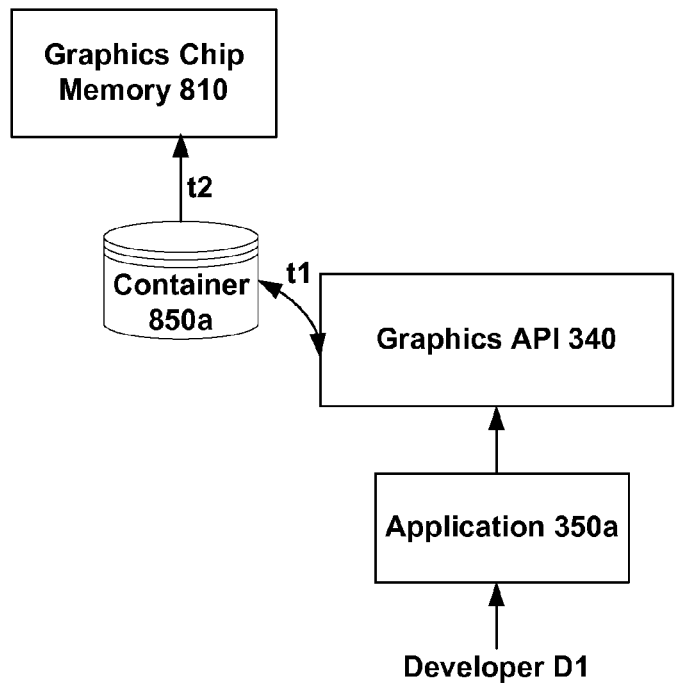
FIG. 9A illustrates a prior art technique whereby data is transmitted to a graphics chip serially.

There are also current issues with respect to the transmission of data containers 850, either pixel and polygon, to a 3D chip. Currently, when a developer goes about specifying multiple data objects to fill multiple containers, these data objects are fed to the 3D chip one by one, or in a serial fashion. As illustrated in FIG. 9A, currently, to feed two data containers 850a and 850b to graphics chip memory 810, developer D1 must feed the objects serially to memory 810. In the figure, t1<t2. At t1, container 850a is retrieved from wherever stored or is created and at t2, it is fed to 3D graphics chip memory 810. In a typical representation of a pixel with eight bits, x, y, z and w may be utilized for the spatial position of the pixel and four more o1, o2, o3 and o4 may be utilized to represent the orientation of the surface, or color etc. at that position. When the position and location of graphics data is constantly changing, serial transmission or loading of graphics chip memory may not reduce performance significantly. However, when there is redundancy of data e.g., when only the orientation of a pixel changes while the spatial position stays the same, opportunity to exploit the redundancy is lost. Thus, serialized data in container 850a is fed to 3D graphics chip memory 810. As will become evident, Even when performed very fast, the serial transmission of data containers 850a and 850b is not as fast as a parallel transmission when there is some redundancy or other reason to transmit data in parallel.

Figure 9B:
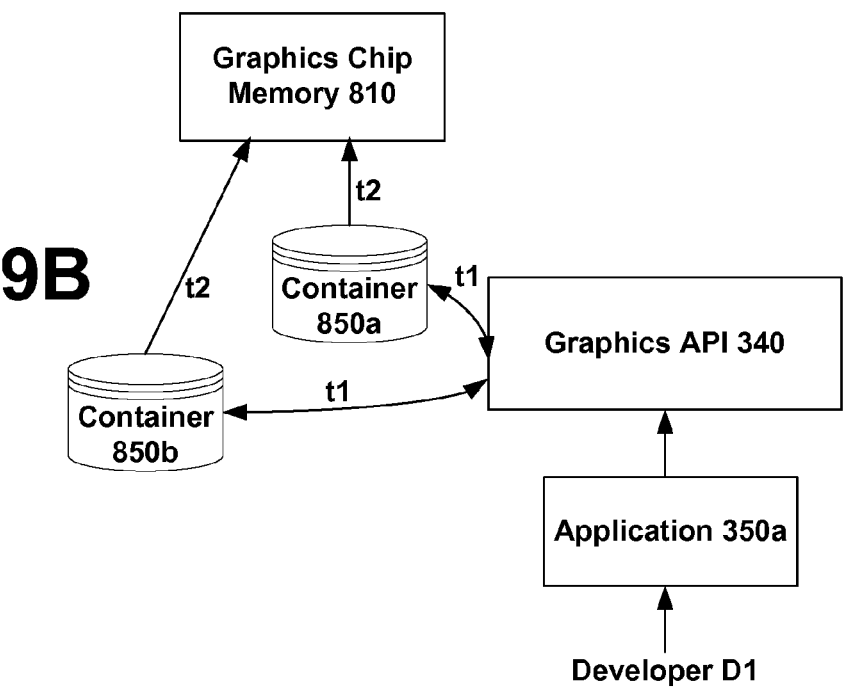
FIG. 9B illustrates a technique in accordance with the 3D graphics API of the present invention whereby data is transmitted to a graphics chip in parallel.

Thus, an optimization in accordance with the present invention is that a developer coding an application may specify that multiple of these data objects wherever originated or located at the time of operation, may be fed to the 3D chip simultaneously or in parallel. As illustrated in FIG. 9B, both containers 850a and 850b may be fed to 3D graphics chip memory 810 at the same time. At t1, the data containers 850a and 850b are retrieved or created, and at t2, containers 850a and 850b are fed to 3D graphics chip memory in parallel. While FIG. 9B illustrates the parallel transmission of two data containers to 3D graphics chip memory 810, any number of data containers up to the maximum storage of 3D graphics chip memory 810 may be fed in parallel. Thus, in the case of the above example where data is being transmitted to 3D graphics chip memory 810, wherein the data includes the same spatial position of pixel(s), but only the orientation or color is changing, the data may be loaded into two separate containers 850a and 850b, with a header description understood by the graphics chip and implemented by graphics API 340, whereby a single copy of the position data can be loaded into container 850a, and the changing color or orientation data may be loaded into container 850b. Thus, when received by the graphics chip 810, the data is loaded correctly into register space and processed according to the header description. In an exemplary implementation, up to 8 data objects 850a, 850b, etc. may be fed in parallel to the graphics chip 810. In such a configuration, the exploitation of redundancies may be performed in connection with any of the 8 values utilized to represent a pixel's location, orientation, etc. The present invention thus supplements previous systems in which data could only be fed serially to a graphics chip with parallel feeding of graphics data.

The term graphics data as used herein is intended to cover not only video and/or audio data in any pre-processed, processed or compressed form, but is additionally intended to cover communications of data of any kind along the graphics pipeline among the developer, the software interface of the present invention and various hardware and/or software components utilized incident to the graphics system.

The various techniques described herein may be implemented with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computer will generally include a processor, a storage medium readable by the processor (including volatile and non-volatile memory and/or storage elements), at least one input device, and at least one output device. One or more programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, the machine becomes an apparatus for practicing the invention. When implemented on a general-purpose processor, the program code combines with the processor to provide a unique apparatus that operates to perform the indexing functionality of the present invention. For example, the storage techniques used in connection with the present invention may invariably be a combination of hardware and software.

While the present invention has been described in connection with the preferred embodiments of the various figures, it is to be understood that other similar embodiments may be used or modifications and additions may be made to the described embodiment for performing the same function of the present invention without deviating therefrom. For example, while exemplary embodiments of the invention are described in the context of graphics data in a PC with a general operating system, one skilled in the art will recognize that the present invention is not limited to the PC, and that a 3D graphics API may apply to any computing device, such as a gaming console, handheld computer, portable computer, etc., whether wired or wireless, and may be applied to any number of such computing devices connected via a communications network, and interacting across the network. Furthermore, it should be emphasized that a variety of computer platforms, including handheld device operating systems and other application specific operating systems are contemplated, especially as the number of wireless networked devices continues to proliferate. Therefore, the present invention should not be limited to any single embodiment, but rather construed in breadth and scope in accordance with the appended claims.

What is claimed:

1. A host computer system that provides data to a graphics system including a procedural shader computational subunit included on a graphics processing unit (GPU) for processing on behalf of said host computer system, comprising a processor having at least one host graphics application programming interface (API) operating thereon, said host graphics API including at least one graphics API call that provides a plurality of algorithmic elements for performing one or more procedural shading algorithms on graphics data to said procedural shader computational subunit of said GPU, wherein each algorithmic element comprises an instruction set packed into an array of numbers and is downloadable to the GPU by the host graphics API, represents one or more computational algorithms, and contains one or more tokens selected by a developer from a list of tokens providing an instruction to be performed by at least one procedural shader computational subunit of said GPU.

2. A host computer system according to claim 1, wherein the procedural shader computational subunit is a vertex shader and wherein said plurality of algorithmic elements are for performing vertex shading algorithms.

3. A host computer system according to claim 2, wherein the plurality of algorithmic elements provide specialized functionality for processing vertices by said procedural shader computational subunit.

4. A host computer system according to claim 1, wherein the procedural shader computational subunit is a pixel shader and wherein said plurality of algorithmic elements are for performing pixel shading algorithms.

5. A host computer system according to claim 4, wherein the plurality of algorithmic elements provide specialized functionality for processing pixel data by said procedural shader computational subunit.

6. A host computer system according to claim 1, wherein the at least one graphics API call includes said array of numbers.

7. A host computer system according to claim 1, wherein the plurality of algorithmic elements comprise instructions for customizing the procedural shader computational subunit to perform at least one of lighting, colorizing, mapping, texturizing, surfacing, shading and enhancing an image.

8. A host computer system according to claim 1, wherein the at least one graphics API call provides a declaration portion to said procedural shader computational subunit for use by a mapping component of said procedural shader computational subunit to map the plurality of algorithmic elements to appropriate storage locations.

9. A host computer system according to claim 8, wherein said at least one graphics API call specifies a graphics data stream and said declaration portion includes assignment information for assigning at least one input register of the procedural shader computational subunit to a corresponding graphics data stream specified by said at least one graphics API call.

10. A host computer system according to claim 9, wherein said declaration portion binds a specific input register of said procedural shader computational subunit to a single element within the graphics data stream.

11. A host computer system according to claim 8, wherein said declaration portion includes assignment information for assigning at least one input register of the procedural shader computational subunit to data output from a tessellator subunit of the GPU.

12. A host computer system according to claim 8, wherein said declaration portion includes assignment information for assigning values to constant memory of the procedural shader computational subunit.

13. A host computer system according to claim 12, wherein said assignment information includes a token that specifies values for one or more contiguous groups of constant registers of the constant memory of the procedural shader computational subunit.

14. A host computer system according to claim 12, wherein said declaration portion includes assignment information for updating an arbitrary subset of the constant memory of the procedural shader computational subunit.

15. A host computer system according to claim 8, wherein said declaration portion includes at least one stream selector token followed by a contiguous set of stream data definition tokens.

16. A host computer system according to claim 15, wherein the contiguous set of stream data definition tokens define a stream, including the set of algorithmic elements within the stream, the order in which the algorithmic elements of the stream appear, the type of each algorithmic element, and a register of the procedural shader computational subunit into which to load each algorithmic element.

17. A host computer system according to claim 16, wherein the set of elements within the stream includes elements that are not loaded into a register of the procedural shader computational subunit.

18. A host computer system according to claim 1, wherein the at least one graphics API further transmits data objects to the procedural shader computational subunit in respective data containers in parallel.

19. A host computer system according to claim 1, wherein the at least one graphics API includes function calls for a 2D and a 3D graphics API.

20. A method of processing graphics data on behalf of a host computer system having a processor, comprising:
    providing a plurality of algorithmic elements for performing one or more procedural shading algorithms on said graphics data to a host graphics application programming interface (API) operating on said processor;
    said host graphics API operating on said processor providing at least one graphics API call to a procedural shader computational subunit included on a graphics processing unit (GPU), said at least one graphics API call including said plurality of algorithmic elements, wherein each algorithmic element comprises an instruction set packed into an array of numbers and is downloadable to the GPU by the host graphics API, represents one or more computational algorithms, and contains one or more tokens selected by a developer from a list of tokens providing an instruction to be performed by at least one procedural shader computational subunit of said GPU; and
    providing said graphics data to said procedural shader computational subunit of said GPU for processing using said one or more computational algorithms.

21. A method according to claim 20, wherein the procedural shader computational subunit is a vertex shader and wherein said step of providing a plurality of algorithmic elements comprises providing algorithmic elements for performing vertex shading algorithms.

22. A method according to claim 21, wherein said step of providing a plurality of algorithmic elements comprises providing algorithmic elements that provide specialized functionality for processing vertices by said procedural shader computational subunit.

23. A method according to claim 20, wherein the procedural shader computational subunit is a pixel shader and wherein said step of providing a plurality of algorithmic elements comprises providing algorithmic elements for performing pixel shading algorithms.

24. A method according to claim 23, wherein the step of providing a plurality of algorithmic elements comprises providing algorithmic elements that provide specialized functionality for processing pixel data by said procedural shader computational subunit.

25. A method according to claim 20, wherein the step of providing said at least one graphics API call includes providing said array of numbers in said at least one graphics API call.

26. A method according to claim 20, wherein the step of providing a plurality of algorithmic elements comprises providing instructions for customizing the procedural shader computational subunit to perform at least one of lighting, colorizing, mapping, texturizing, surfacing, shading and enhancing an image.

27. A method according to claim 20, wherein the step of providing said at least one graphics API call includes providing a declaration portion to said procedural shader computational subunit for use by a mapping component of said procedural shader computational subunit to map the plurality of algorithmic elements to appropriate storage locations.

28. A method according to claim 27, wherein the step of providing said at least one graphics API call includes specifying a graphics data stream and assignment information for assigning at least one input register of the procedural shader computational subunit to a corresponding graphics data stream specified by said at least one graphics API call.

29. A method according to claim 28, further comprising binding a specific input register of said procedural shader computational subunit to a single element within the graphics data stream using said declaration portion.

30. A method according to claim 27, wherein providing said declaration portion includes providing assignment information for assigning at least one input register of the procedural shader computational subunit to data output from a tessellator subunit of the GPU.

31. A method according to claim 27, wherein providing said declaration portion includes providing assignment information for assigning values to constant memory of the procedural shader computational subunit.

32. A method according to claim 31, wherein providing said assignment information includes providing a token that specifies values for one or more contiguous groups of constant registers of the constant memory of the procedural shader computational subunit.

33. A method according to claim 31, wherein providing said declaration portion includes providing assignment information for updating an arbitrary subset of the constant memory of the procedural shader computational subunit.

34. A method according to claim 27, wherein providing said declaration portion includes providing at least one stream selector token followed by a contiguous set of stream data definition tokens.

35. A method according to claim 34, wherein providing the contiguous set of stream data definition tokens comprises defining a stream, including the set of algorithmic elements within the stream, and specifying the order in which the algorithmic elements of the stream appear, the type of each algorithmic element, and a register of the procedural shader computational subunit into which to load each algorithmic element.

36. A method according to claim 35, wherein defining the set of elements within the stream includes defining elements that are not loaded into a register of the procedural shader computational subunit.

37. A method according to claim 20, further comprising transmitting data objects to the procedural shader computational subunit in respective data containers in parallel.

38. A method according to claim 20, further comprising said host graphics API providing function calls for a 2D and a 3D graphics API.

* * * * *